(12) United States Patent
Kteily

(10) Patent No.: US 12,007,592 B2
(45) Date of Patent: Jun. 11, 2024

(54) WELDING TORCH MAINTENANCE CENTER

(71) Applicant: Nasarc Technologies Inc., Waterloo (CA)

(72) Inventor: Naseem E. Kteily, Ontario (CA)

(73) Assignee: Nasarc Technologies Inc., Waterloo (CA)

(*) Notice: Subject to any disclaimer, the term of this patent is extended or adjusted under 35 U.S.C. 154(b) by 0 days.

(21) Appl. No.: 17/861,433

(22) Filed: Jul. 11, 2022

(65) Prior Publication Data

US 2022/0339730 A1  Oct. 27, 2022

Related U.S. Application Data

(63) Continuation of application No. 16/814,547, filed on Mar. 10, 2020, now Pat. No. 11,426,815, which is a (Continued)

(51) Int. Cl.
*B23K 9/26* (2006.01)
*B23K 9/32* (2006.01)
(Continued)

(52) U.S. Cl.
CPC .............. *G02B 5/1861* (2013.01); *B23K 9/26* (2013.01); *B23K 9/328* (2013.01); *G02B 5/1871* (2013.01); *G02B 1/02* (2013.01); *G02B 5/1809* (2013.01)

(58) Field of Classification Search
CPC ... B23K 9/24; B23K 9/26; B23K 9/28; B23K 9/32; B23K 9/328; G02B 1/02; G02B 5/1809; G02B 5/1861; G02B 5/1871
See application file for complete search history.

(56) References Cited

U.S. PATENT DOCUMENTS 4,733,050 A * 3/1988 Grafius ................... B23K 9/32
219/137.43
2005/0211684 A1 9/2005 Jaeger et al.
(Continued)

FOREIGN PATENT DOCUMENTS

JP    S60176880 U    11/1985
JP    H0323078 A     1/1991

OTHER PUBLICATIONS

Canadian Office Action issued in Application No. 2,954, 180 dated May 18, 2022.
(Continued)

*Primary Examiner* — Sang Y Paik
(74) *Attorney, Agent, or Firm* — Amster, Rothstein & Ebenstein LLP

(57) ABSTRACT

A welding torch maintenance apparatus and a welding tip changer are described. The welding torch maintenance apparatus and the welding tip changing apparatus each comprise a first gripping means for fastening the welding torch/diffuser so that the nozzle/welding tip is aligned with the rotational axis, a second gripping means for holding the nozzle/welding tip, the second gripping means rotates about the rotational axis to remove the nozzle/welding tip, and moves along the rotational axis. A drive means is provided for rotating the second gripping means, and a lift system is provided for moving the second gripping along the rotational axis. The welding torch maintenance apparatus further includes a cleaning means which enters the nozzle at the distal end and cleans an interior of the nozzle.

9 Claims, 33 Drawing Sheets

Related U.S. Application Data continuation of application No. 15/323,927, filed as application No. PCT/CA2015/050622 on Jul. 3, 2015, now Pat. No. 10,583,515.

(60) Provisional application No. 62/012,059, filed on Jun. 13, 2014.

(51) Int. Cl.
*G02B 5/18* (2006.01)
*G02B 1/02* (2006.01)

(56) References Cited

U.S. PATENT DOCUMENTS

| | | | |
|---|---|---|---|
| 2007/0056945 A1* | 3/2007 | Hammen | B23K 9/295 219/137.43 |
| 2008/0149608 A1* | 6/2008 | Albrecht | B23K 9/0956 219/136 |
| 2013/0008003 A1 | 1/2013 | Izutani et al. | |

OTHER PUBLICATIONS

European Search Report issued in Application No. 22153900.0 dated Jul. 7, 2022.

* cited by examiner

WELDING TORCH MAINTENANCE CENTER

FIELD OF THE INVENTION

The present invention relates to maintenance of a welding torch, and more specifically, to a welding torch maintenance center.

BACKGROUND OF THE INVENTION

A well-known welding technique is arc welding whereby the welding electrodes are deliberately consumed during the welding process, and come to form an integral component of the welded product.

Metal-inert-gas ("MIG") arc welding is an arc welding technique in which a relatively fine wire electrode is fed continuously from a large spool with a variable speed drive whose speed is controlled to optimize arc length and burnoff rate. During the welding process, the electrical arc that extends between the electrode and the metal surfaces that are being welded, is shielded within a gas flow. Argon or other gases with suitable characteristics such as carbon dioxide may be used.

Gas flow in MIG welding can be adversely affected by weld spatter of the melted welding wire which can adhere to nozzle, welding tip or other components of a welding torch disposed about the welding tip. Weld spatter is a hard material and is known to build up to a considerable degree if not removed periodically, and consequently restrict the gas flow between the nozzle and the welding tip. Weld spatter that accumulates on the nozzle or the welding tip can also build up to a point at which weld wire feed is impeded and the arc welding process is damaged. This decreases the reliability and performance of the weld.

The accumulation of weld splatter also decreases the physical distance between the charged welding tip and the electrically insulated nozzle. If the distance decreases sufficiently, the voltage differential will exceed the dielectric strength of the intervening gas flow, and the arc will jump between the welding tip and the nozzle. This results in a diminished amount of electrical energy being delivered to the weld site. Therefore, if the buildup continues to excess, a complete breakdown of the welding process may result.

While anti-spatter compounds are available for spray application to the gas nozzle or the welding tip, they serve only to delay the deposition of spatter, not to prevent it.

Cleaning torch components manually is generally inefficient, considering the high cost of operating an assembly line with the robotic welding machine.

There is therefore a need to provide an apparatus for removing the weld splatter adhered to the nozzle, the welding tip and/or other components of the welding torch.

SUMMARY OF THE INVENTION

According to an aspect of the invention, a welding torch maintenance apparatus is provided for servicing a welding torch. The welding torch may include a diffuser, a welding tip, and a nozzle having a distal end and a proximal end. The proximal end of the nozzle is attached to a welding arm or collar of the welding torch. The welding torch maintenance apparatus includes a first gripping means for fastening the welding arm of the welding torch and a second gripping means for holding the nozzle. The second gripping means is rotatable about a rotational axis to remove the nozzle from the welding torch, and is also movable along the rotational axis. A drive means is provided for rotating the second gripping means; and a lift system is provided for moving the second gripping means along the rotational axis. The welding torch maintenance apparatus further includes a cleaning means, where the cleaning means enters the nozzle at the distal end and cleans an interior of the nozzle.

According to another aspect of the invention, a welding tip changing apparatus is provided including a first gripping means for fastening a diffuser of a welding torch and a second gripping means for holding a welding tip. The second gripping means is rotatable about a rotational axis to remove the welding tip, and is also movable along the rotational axis. The welding tip changing apparatus further includes a drive means for rotating the second gripping means; and a lift system for moving the second gripping means along the rotational axis.

The welding torch maintenance apparatus and the welding tip changing apparatus may include an actuating means for providing a degree of movement freedom for the second gripping means in a direction parallel to the rotational axis.

The welding torch maintenance apparatus may further include a diffuser cleaning module for cleaning the welding tip and/or diffuser.

According to another aspect of the invention, a method is provided for servicing the welding torch, the method including fastening the welding torch so that a central axis of the nozzle of the welding torch are aligned with a rotational axis; holding the nozzle and rotating the nozzle about the rotational axis to remove the nozzle; lowering the nozzle along the rotational axis; and cleaning an interior of the nozzle through the distal end of the nozzle, wherein a degree of movement freedom is provided along the rotational axis.

According to a yet another aspect of the invention, a method is provided for replacing a welding tip which include fastening a diffuser of a welding torch; holding a welding tip of the welding torch and rotating the welding tip about a rotational axis to remove the welding tip; providing a new welding tip; and attaching the new welding tip to the welding torch, wherein a degree of movement freedom is provided along the rotational axis.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Figure 1:
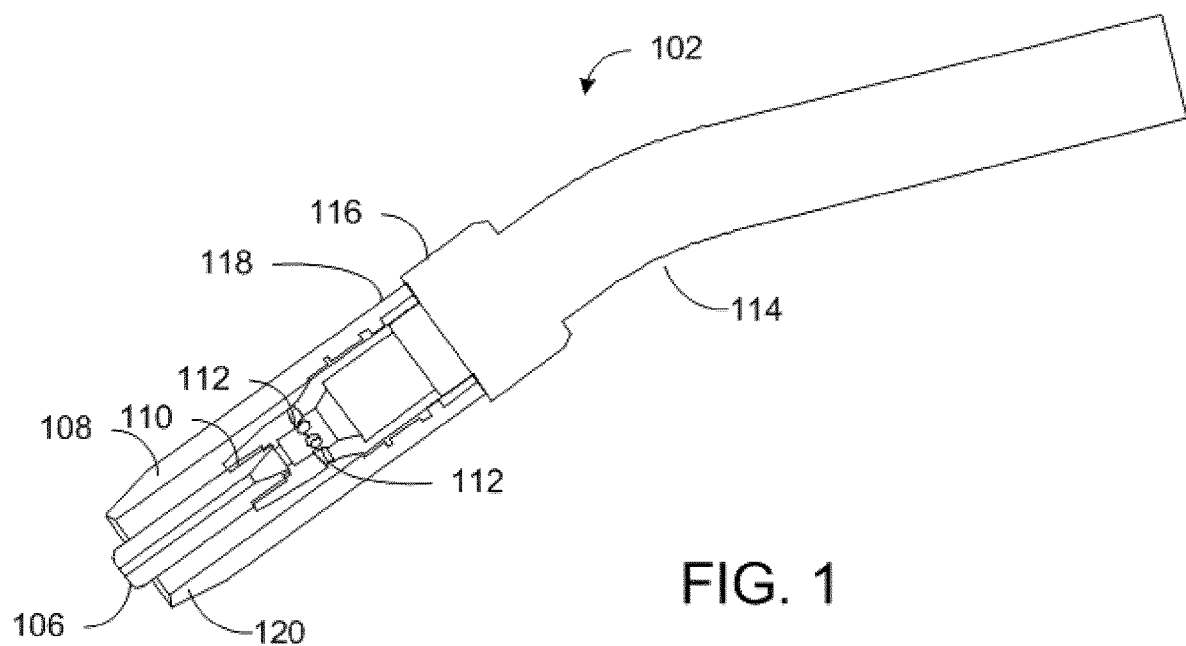
FIG. 1 is a cross sectional view of a welding torch.

Referring to the drawings, FIG. 1 shows a welding torch 102 used in connection with the welding torch maintenance center according to an embodiment of the invention. The welding torch 102 includes an open cylindrical nozzle 108 and a central, electrically charged welding tip 106 for extending weld wire (not shown). The welding tip 106 is attached to a gas diffuser 110, the gas diffuser 110 being connected to a gas source (not shown) and including holes 112 for distributing gas into the nozzle 108 to control the welding environment at the weld. At a proximal end 118 of the nozzle 108, the nozzle 108 may be mounted to a welding arm or collar 116 of the welding torch 102. The connection between the nozzle 108 and the welding arm or collar 116 of the welding torch 102 may be of a threaded or a slipped-on type. The welding tip 106 may be connected to the diffuser 110 via a thread, and is in concentric relationship with the nozzle 108. The welding tip 106 may protrude a distal end 120 of the nozzle 108. The welding torch 102 may be bent at a location adjacent to the collar 116 and thus forming a "goose neck" 114.

The welding tip 106 guides the wire electrode toward the weld site. A flow of inert gas distributed by the gas diffuser 110 concentrically surrounds the welding tip 106 and maintains a gas shield around the wire electrode to avoid inclusion of contaminants in the weld. Both consistent and continuous gas flow and arc patterning are prerequisites for a quality weld. Due to the high welding speed in MIG welding, such as robotic MIG welding, the weld quality is especially sensitive to those variations which are attributable to adverse gas flow or arc patterning influences. Weld spatter of the melted welding wire which adheres to the nozzle 108, the welding tip 106 or other components of the welding torch 102 may redirect against the desired electrical arc pattern and should be removed to maintain the quality of the weld.

The welding torch maintenance center according to the present invention includes various tools for servicing the welding torch 102. In some embodiments, some or all tools may be located within a single enclosure. In other embodiments, the welding torch maintenance center may include a plurality of apparatuses. In the illustrated embodiments, the welding torch maintenance center may include tools for removing and cleaning the nozzle 108 and tools for cleaning the welding tip 106 and/or the diffuser 110, depicted as a welding torch maintenance apparatus 200 shown in FIG. 2. The welding torch maintenance center may also include tools for replacing the welding tip 106, depicted as a welding tip changing apparatus 1500 shown in FIG. 15. The welding tip changing apparatus 1500 may be located in proximity to the welding torch maintenance apparatus 200. The welding torch 102 may be part of a robot or a robotic arm and is moved in a coordinated fashion between the various tools of the welding torch maintenance center. The servicing of the welding torch 102 can be completed in a single run between the various tools. Alternatively, the various tools can be used separately for their individual functions.

According to an embodiment of the present invention, air driving means may be provided in connection with the various tools of the welding torch maintenance center. The air driving means may be actuated by pneumatic valves which are controlled by a programmable control unit that interfaces with the robot control system.

Figure 2A:
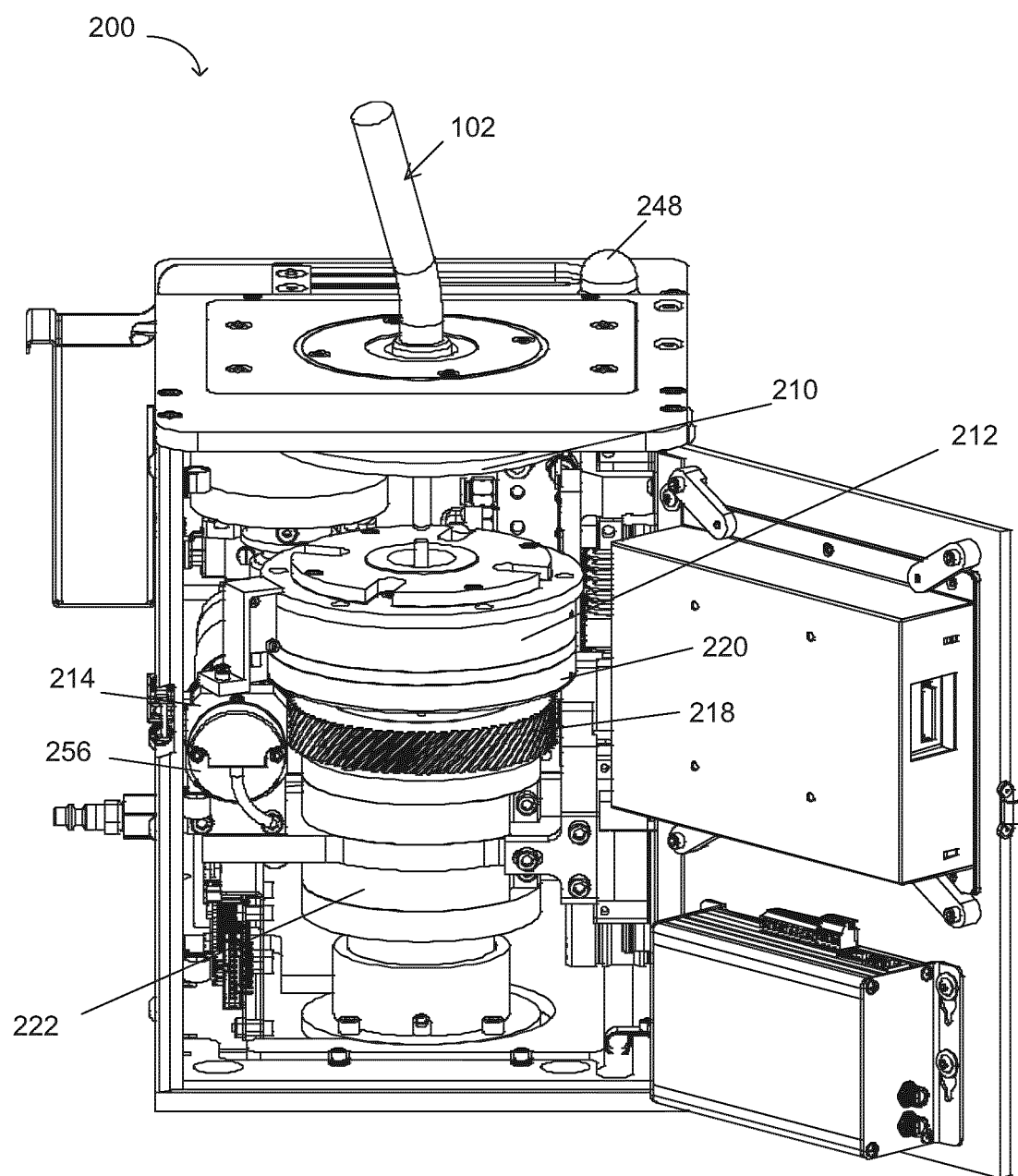
FIG. 2(a) is a front view of a welding torch maintenance apparatus in accordance with one embodiment of the present invention.
Figure 2B:
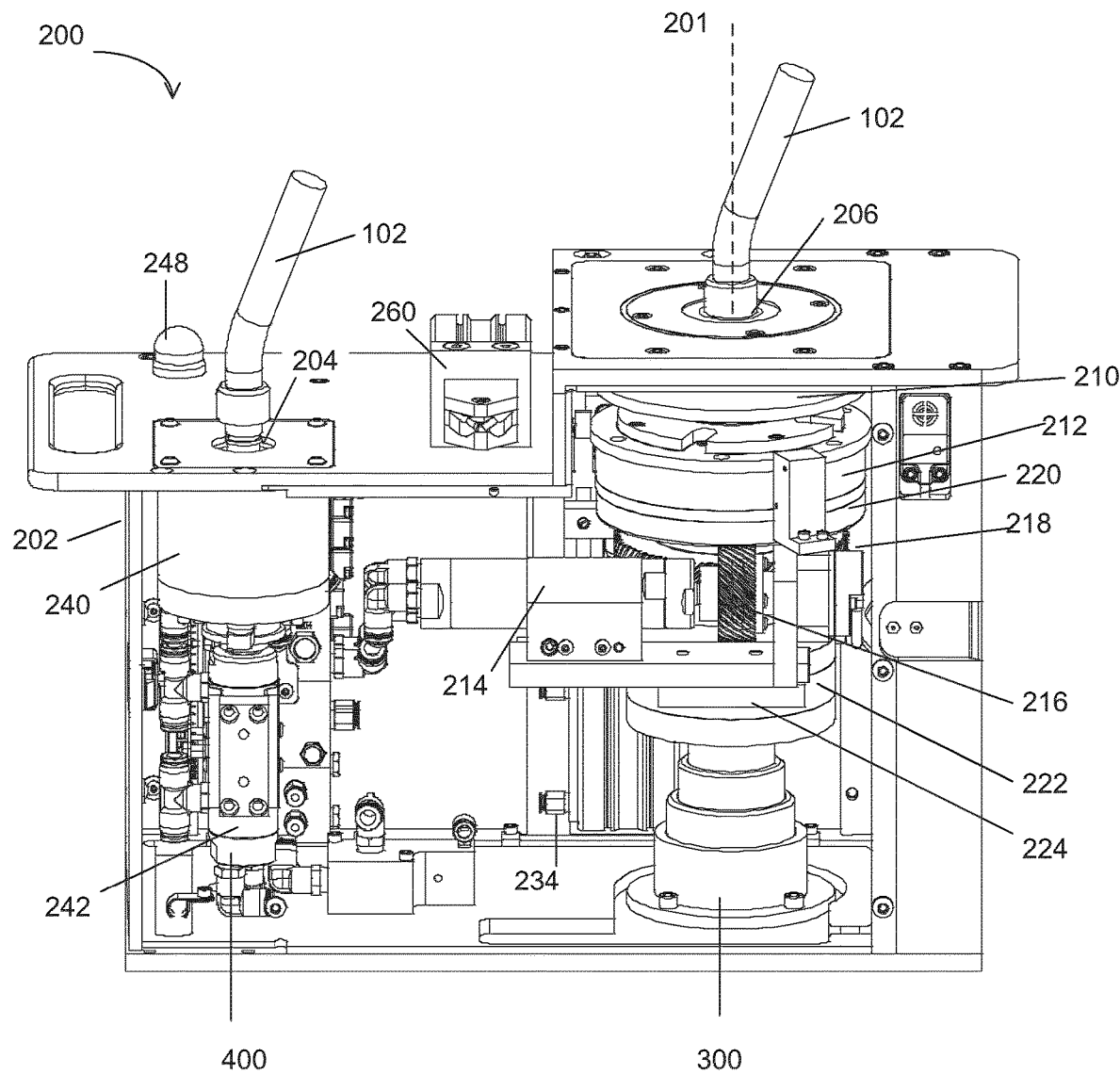
FIG. 2(b) is a left side view of the welding torch maintenance apparatus of FIG. 2(a)
Figure 2C:
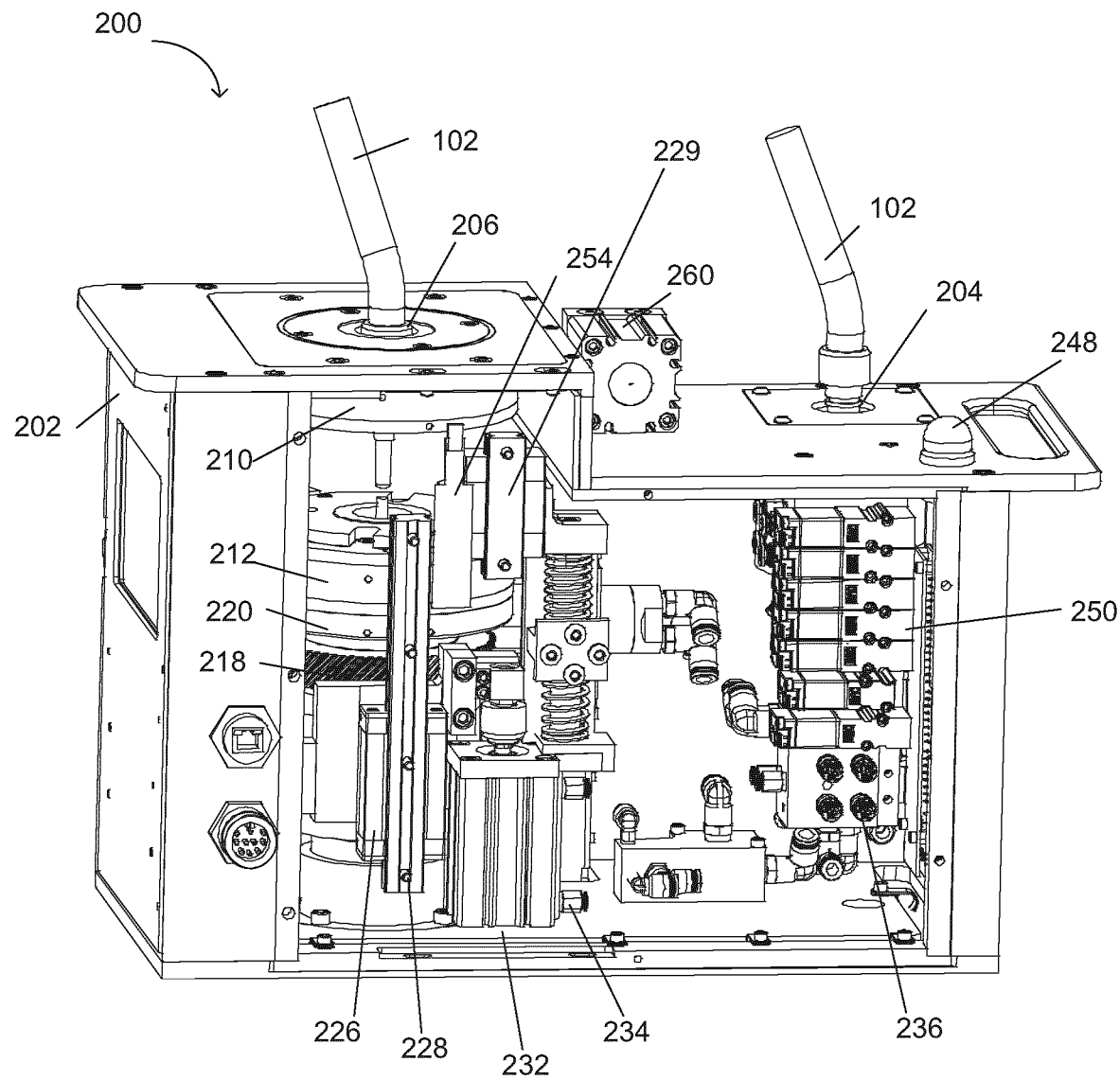
FIG. 2(c) is a right side view of the welding torch maintenance apparatus of FIG. 2(a)

FIGS. 2(a)-2(c) show the welding torch maintenance apparatus 200 in accordance with one embodiment of the present invention. FIG. 2(a) is a front perspective view of the welding torch maintenance apparatus 200, and FIGS. 2(b) and 2(c) are the left and right side views, respectively.

As shown in FIGS. 2(a)-2(c), the welding torch maintenance apparatus 200 includes an enclosure 202 with apertures 204, 206 for receiving the welding torch 102 to be serviced by the tools inside the enclosure 202. In one embodiment, the welding torch 102 on a robotic arm (not shown) is moved between various defined three dimensional coordinates, for example, between the positions illustrated by the welding torch 102, under the control of its programmable controller.

With reference to FIGS. 2(b) and 2(c), the welding torch maintenance apparatus 200 includes a nozzle removal module 300 for removing and cleaning the nozzle 108 of the welding torch 102, and a diffuser cleaning module 400 for cleaning the welding tip 106 and/or the diffuser 110 of the welding torch 102.

According to an embodiment of the present invention, the nozzle removal module 300 includes a first clamp 210 and a second clamp 212. The first clamp 210 is adapted to fixedly engage a portion of the welding torch 102 at the goose neck 114 or at another defined point in the operational space of the robotic arm. The first clamp 210 may include a plurality of moveable, cooperative gripping inserts, for example, jaws of a collet, which are adapted to receive and fasten the welding torch 102 in a releasably clamped relation therebetween. In general, the gripping inserts are in an equidistantly spaced relation around a rotational axis 201. Once the first clamp 210 fastens the welding torch 102 in position, a central axis of the nozzle 108 of the welding torch 102 is in alignment with the rotational axis 201.

The second clamp 212 is provided for holding the nozzle 108 and may have a similar or identical structure as the first clamp 210. The second clamp 212 is movable between a closing position, in which the gripping inserts are extended to clamp and hold the nozzle 108, and a retracted and open position in which gripping inserts are positioned out of the closing relation. The second clamp 212 is further adapted to rotate about a central axis which is aligned with the rotational axis 201. It will be apparent to a person skilled in the art that other implementations for the first and the second clamp 210, 212 are readily available, for example, other pneumatically or electrically controlled clamps, or a locking slider, for securing the welding torch 102 and the nozzle 108, respectively.

The nozzle removal module 300 also includes a drive means for rotating the second clamp 212. In the illustrated embodiment in FIGS. 2(b) and 2(c), the drive means includes a horizontal rotary pneumatic motor 214 and helical gears 216, 218 where the second clamp 212 is caused to rotate together with the rotation of the helical gear 218. It will be apparent to a person skilled in the art that other implementations are readily available, for example, other pneumatic or electrical motor arrangements.

The helical gear 218 is coupled to the second clamp 212 through a rotary air feed plate 220 so that the second clamp 212 is in pneumatic communication with an air distribution assembly 222 which operates to open and close the second clamp 212. The nozzle removal module 300 further includes a lift system for moving the second clamp 212 vertically along the rotational axis 201. In the illustrated embodiment in FIGS. 2(b) and 2(c), the lift system includes a cylinder 232 operated with a dump and fill manifold 236. In operation, the second clamp 212 holds the nozzle 108 of the welding torch 102 and rotates about the rotational axis 201 to unthread the nozzle 108. The rotation of the second clamp 212 may start prior to the second clamp 212 moving into the closing position. As the second clamp 212 holds and unthreads the nozzle 108, the second clamp 212 is actuated vertically to lower the nozzle 108 to detach it from the welding torch 102. A cleaning means, for example, a brush, a reamer or a milling means, in turn enters the nozzle 108 from the distal end 120 and cleans the interior of the nozzle 108, as will be described below.

In the illustrated embodiment of FIGS. 2(b) and 2(c), the diffuser cleaning module 400 includes a tip/diffuser cleaning assembly 240, and a drive means, for example, a rotary pneumatic motor 242 may be used to rotate the tip/diffuser cleaning assembly 240.

Referring to FIGS. 2(a) to 2(c), the enclosure 202 may further include a status light 248 to indicate the operation status of the welding torch maintenance apparatus 200, and valve banks 250 for controlling the operations of the various pneumatic drive means. The rotational speed of the horizontal rotary pneumatic motor 214 may be monitored by a rotational speed monitor 256.

The welding torch maintenance apparatus 200 may further include a welding wire cutter 260 for clipping the end of the weld wire from the welding tip 106. Wire cutting is particularly important if a ball of weld wire is formed on the welding tip 106. Wire cutting is performed before servicing of the welding torch 102 starts, and may optionally be performed a second and/or a third time to remove weld wire exposed during operation. Alternatively, the exposed wire may be retracted instead of being cut in order to save operational time.

Figure 3:
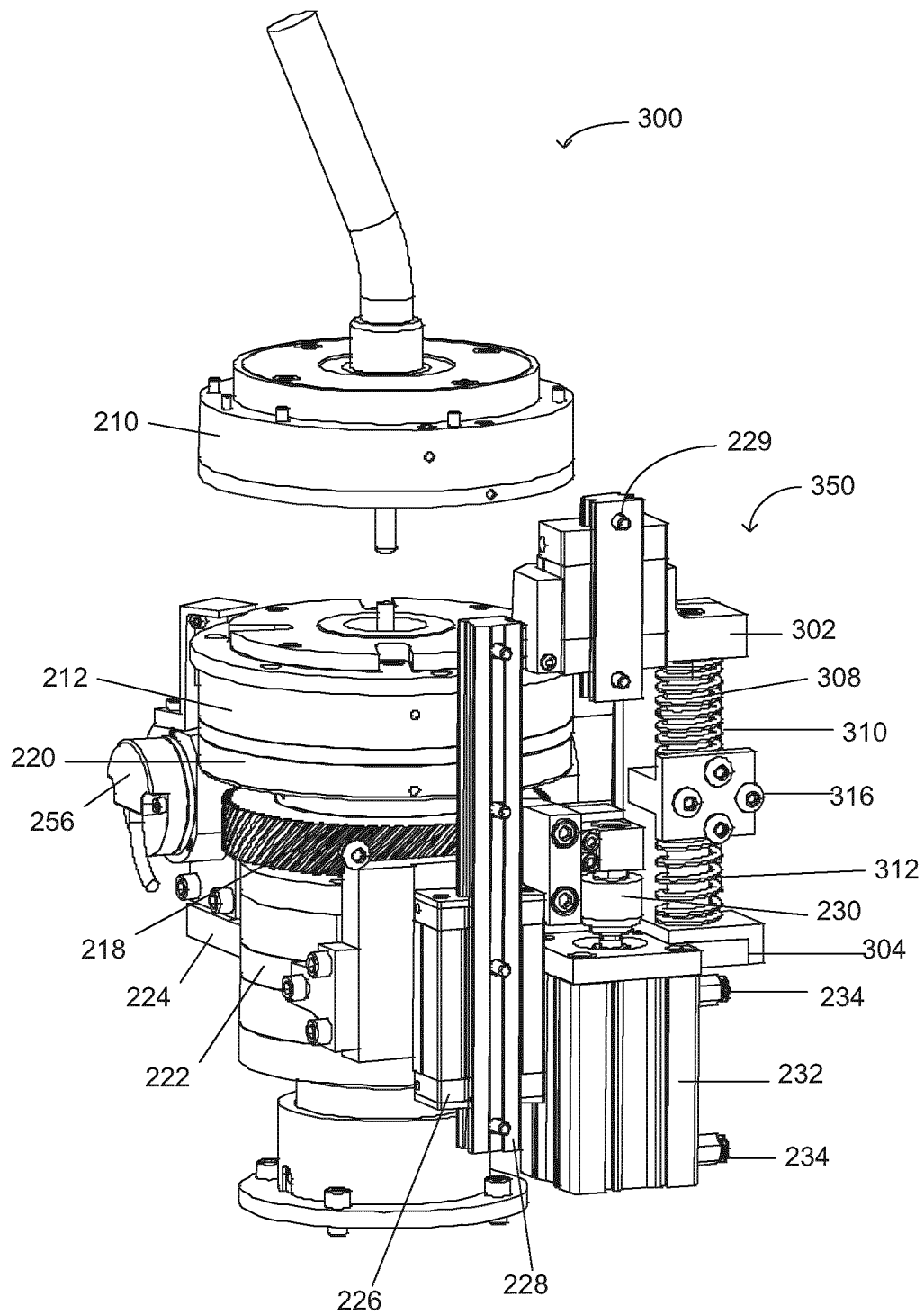
FIG. 3(a) is a perspective view of the nozzle removal module in the welding torch maintenance apparatus in accordance with one embodiment of the present invention.
FIG. 3(b) is a perspective view of the nozzle removal module in the welding torch maintenance apparatus in accordance with another embodiment of the present invention.
Figure 3:
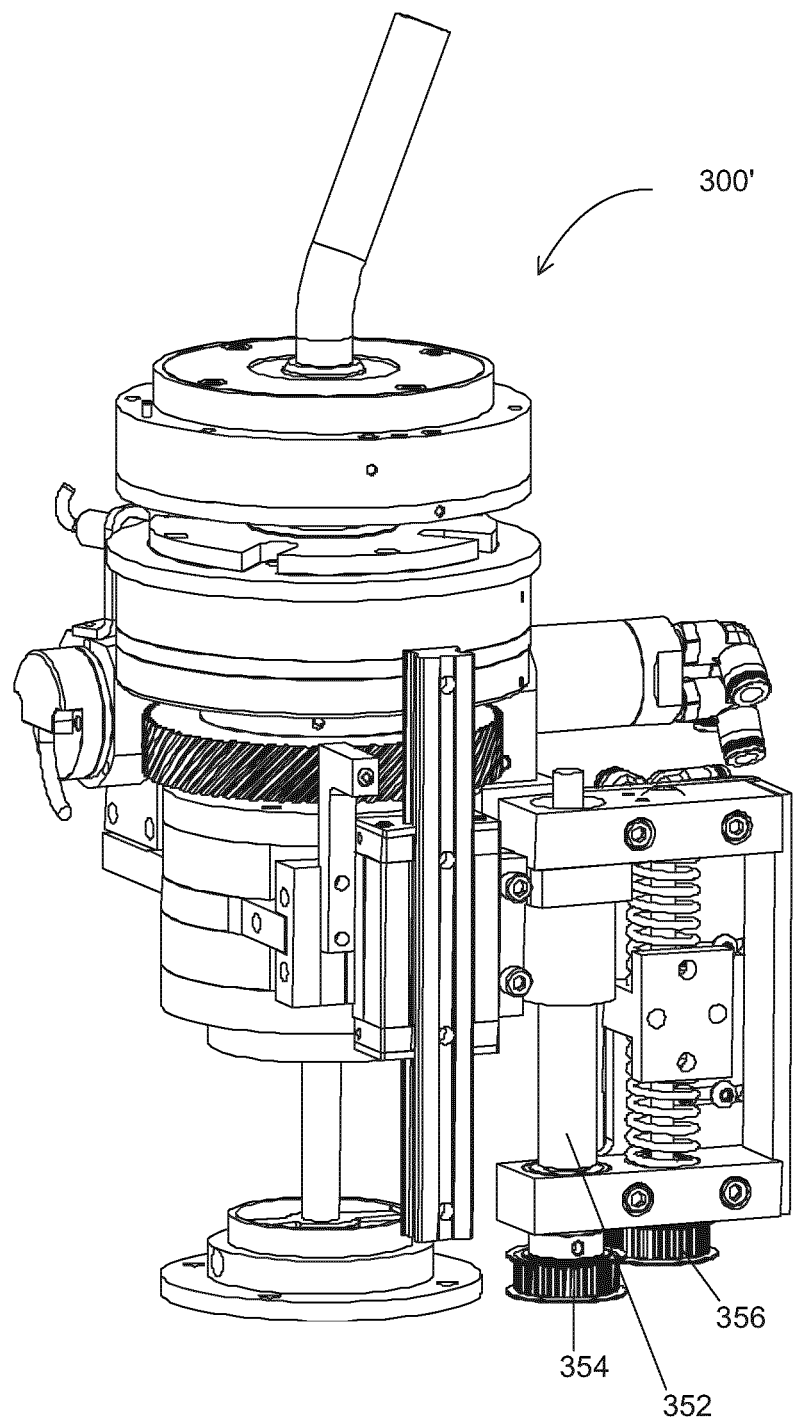

FIG. 3(a) illustrates the nozzle removal module of the welding torch maintenance center, indicated as 300, according to an embodiment of the invention. The nozzle removal module 300 includes a lift system, which in the illustrated embodiment includes the cylinder 232, for moving the second clamp 212 vertically along the rotational axis 201. The air distribution assembly 222 includes a guide plate 224 fastened to a carriage 226. The guide plate 224 secures and carries the second clamp 212, the rotary air feed plate 220, the horizontal rotary pneumatic motor 214 and the helical gear 216, 218. The carriage 226 is slidable along a vertical rail 228 and is attached to an alignment joint or floating connector 230 of the cylinder 232. The carriage 226 slides along the vertical rail 228 when the cylinder 232 is driven pneumatically via air inlets 234. When actuated, the cylinder 232 carrying the carriage 226, together with the air distribution assembly 222, the second clamp 212, the rotary air feed plate 220, the horizontal rotary pneumatic motor 214 and the helical gear 216, 218, moves in the vertical direction.

In accordance with one embodiment of the present invention, the lift system further includes a level assembly 350 for providing a degree of movement freedom in the vertical direction. In the illustrated embodiment, the level assembly 350 includes an upper bearing plate 302 and a lower bearing plate 304, collectively forming a holder member for holding the cylinder 232. A spring rod 308 is provided between the upper bearing plate 302 and the lower bearing plate 304 as support for an upper spring 310, a lower spring 312 and a supporting member 316 in between the two springs 310, 312. Preferably, the rail 228 and the supporting member 316 are mounted to a rigid structure, for example, a frame member of the welding torch maintenance apparatus 200. The rail 228 provides the directional guidance so that the second clamp 212, the rotary pneumatic motor 214, the helical gears 216, 218 and the air distribution assembly 222 moves in the vertical direction, when driven through the cylinder 232. At the same time, the cylinder 232 forms a unitary structure with the holder member, which can be moved relative to the supporting member 316 along a second rail 229. The relative movement between the holder member and the supporting member 316 is constrained by a resilient means, in the illustrated example, the upper spring 310 and the lower spring 312. As a result, a degree of movement freedom is provided in the vertical direction as the holder member, together with the second clamp 212, the rotary pneumatic motor 214, the helical gears 216, 218 and the air distribution assembly 222, may move slightly relative to the supporting member 316 in the vertical direction.

FIG. 3(b) illustrates the nozzle removal module 300', according to another embodiment of the invention. In this embodiment, the lift system includes a lead screw 352 driven by a rotary pneumatic motor (not shown). The lift system may use a first pulley 354 at the end of the lead screw 352, a second pulley 356 and a timing belt (not shown) in connection with the rotary pneumatic motor. It will be apparent to a person skilled in the art that other implementations of the lift system are readily available, for example, other drive means such as electrical motor or servo motor may be used to move the carriage vertically.

The nozzle removal module 300, 300' provides a degree of movement freedom in the vertical direction which compensates a potential offset between the thread pitch of the nozzle 108 and the welding torch 102. Such a degree of freedom also provides a buffer to accommodate the rotational speed and/or lift rate of the second clamp 212. As will be apparent to a person skilled in the art, the threads may likely not be aligned at the beginning of the process. Using force to remove or reattach the nozzle 108 may likely result in cross-threading between the nozzle 108 and the welding torch 102. The vertical movement freedom provided by the holder member, the supporting member 316, the upper spring 310 and the lower spring 312 acts as two-way dampeners in the vertical direction allowing the nozzle 108 being rotated by the second clamp 212 to properly detach from or reattach to the welding torch 102.

In accordance with one embodiment of the present invention, the nozzle removal module 300, 300' includes movement detecting means to detect the vertical movement. In the illustrated embodiments, the movement detecting means may include two potentiometers. Referring to FIG. 2(c), a first potentiometer 254 is used in connection with the second rail 229 and acts to monitor the motion of the springs 310, 312. When the springs 310, 312 begin compression, the potentiometer 254 detects the motion and the second clamp 212 is caused to rotate. If the springs 310, 312 are overly compressed, the nozzle 108 may be under an excessive pressure; in such a case the potentiometer 254 will detect the compression and the lift system will be actuated to be vertically adjusted. The lift system may be adjusted several times vertically alternating between pausing and moving, in order to optimize the spring force and to avoid thread relaxation. A second potentiometer (not shown) may be used in connection with the rail 228 to monitor the motion of the lift system.

Figure 4A:
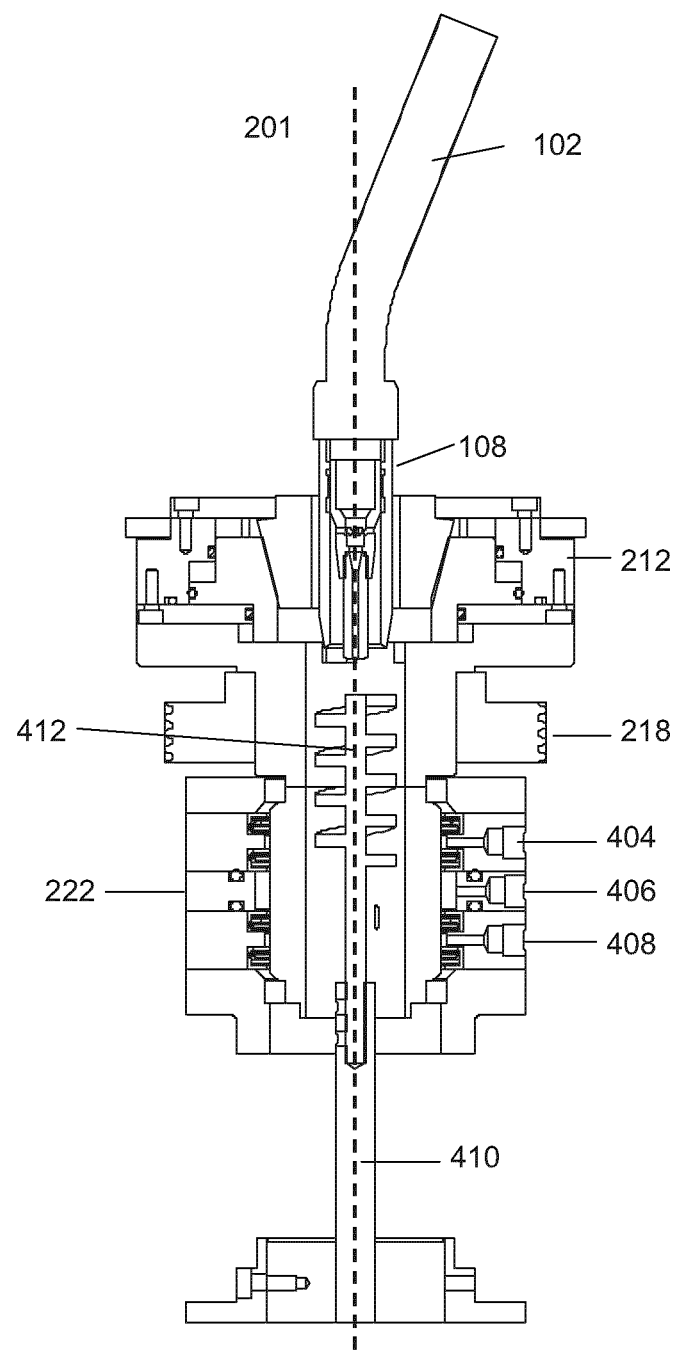
FIG. 4(a) is a sectional view of the nozzle removal module, where the nozzle is attached to the welding torch.
Figure 4B:
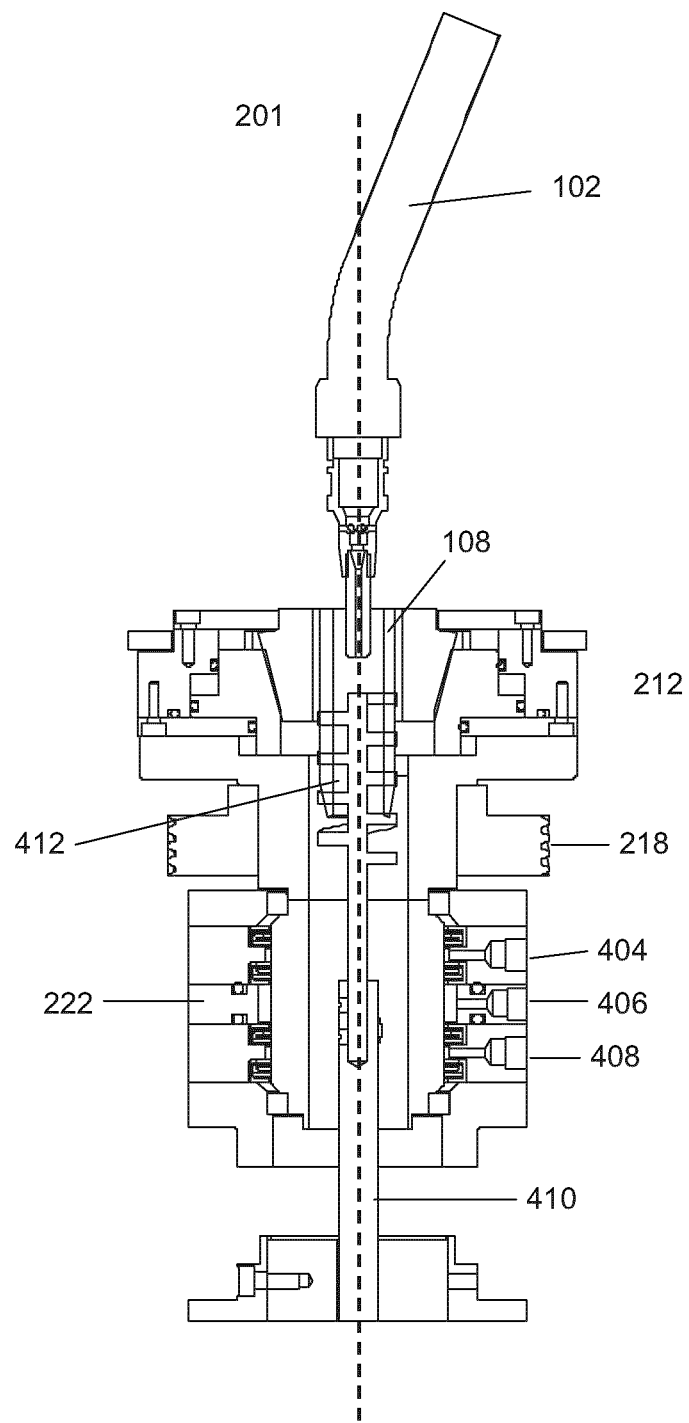
FIG. 4(b) is a sectional view of the nozzle removal module, where the nozzle is removed from the welding torch and the cleaning means entering the nozzle.

FIGS. 4(a) and 4(b) provide sectional views of the nozzle removal module 300 in accordance with an embodiment. The nozzle 108 is generally attached to the welding torch 102 and is secured by the second clamp 212 in FIG. 4(a). The second clamp 212 may be caused to open or close its clamps by the air distribution assembly 222 through air inlets 406, 408.

As described above, the second clamp 212 is rotatable about the rotational axis 201 together with the gear 218, thereby disengaging a threaded portion of the nozzle 108 from the welding torch 102. As the second clamp 212 rotates, the second clamp 212 may simultaneously be actuated vertically to detach the nozzle 108 from the welding torch 102. To reattach the nozzle 108 to the welding torch 102, the second clamp 212 can rotate in the opposite direction about the same axis 201, engaging the threaded portion of the nozzle 108 to the welding torch 102.

With reference to FIG. 4(b), as the second clamp 212 holds and lowers the nozzle 108 to detach it from the welding torch 102, a cleaning means 412 may enter the nozzle 108 from the distal end 120 to clean the nozzle 108. The cleaning means 412 may be, for example, a brush, a reamer or a milling means which is mounted on a shaft 410. The nozzle 108 may continue to be rotated by the second clamp 212. The shaft 410 carrying the cleaning means 412 may be stationary, or alternatively, rotate with respect to the axis 201, for example, in a direction opposite from that of the second clamp 212. The shaft 410 may extend and/or retract in the vertical direction to enter and/or exit the nozzle 108. The relative movement between the nozzle 108 and the cleaning means 412 dislocates spatters accumulated on interior surfaces of the nozzle 108.

Figure 5:
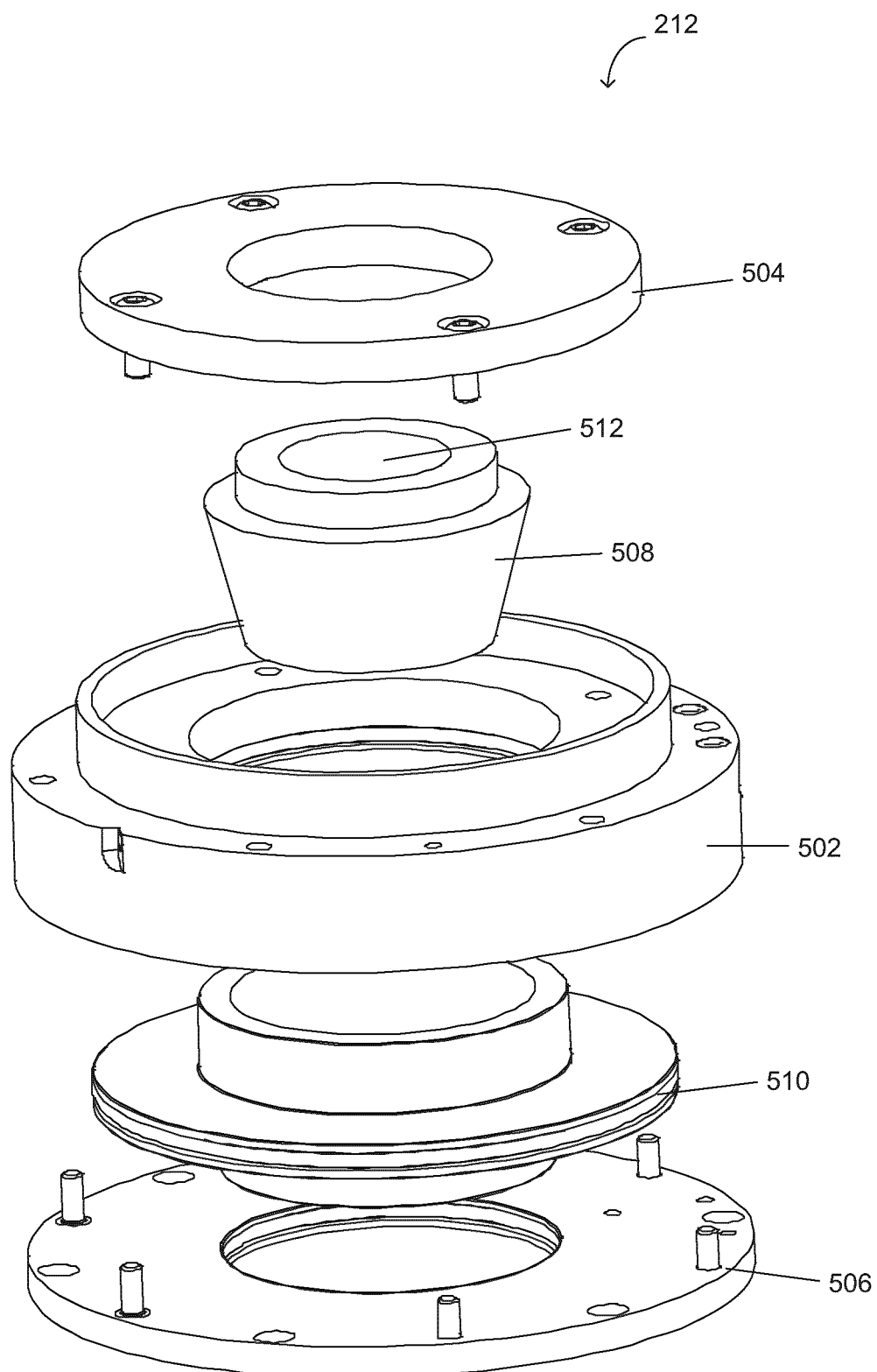
FIG. 5 is an exploded view of a gripper collet in accordance with one embodiment of the present application.

FIG. 5 provides an exploded view of the second clamp 212, in accordance with one embodiment of the present invention. As illustrated in this particular embodiment, the second clamp 212 is a gripper collet. The gripper collet 212 may include a gripper housing 502, a top cover 504, and a bottom cover 506. A sleeve 508 located in the gripper housing 502 includes a cylindrical inner surface defining a through opening 512 and a conical outer surface. The sleeve 508 may be made of, for example, spring steel. The sleeve 508 may be one-piece or may include a plurality of cooperative gripping jaws. A matching taper 510 engages the sleeve 508 and may have a tapered inner surface that can be caused to compress the sleeve 508 radially inwardly such that the inner surface of the sleeve 508 contracts to a slightly smaller opening diameter. The matching taper 510 is movable upon pneumatic activation in the vertical direction to transition the taper 508 between an open position and a closing position. The top cover 504 encloses the sleeve 508, and the bottom cover 506 encloses the taper 510 respectively to the gripper housing 502, by means of fasteners, for example, bolts, pins or shoulder screws.

Figure 6:
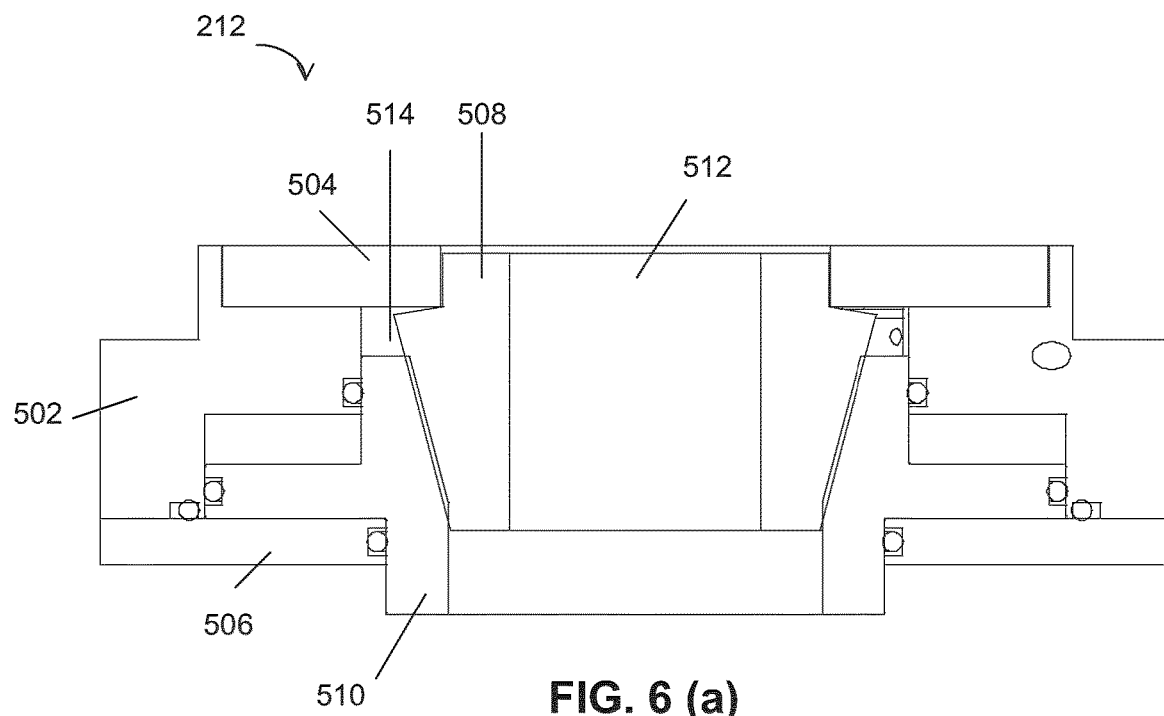
FIG. 6(a) is a cross-sectional view showing the gripper collet in an open position.
FIG. 6(b) is a cross-sectional view showing the gripper collet in a closing position.
Figure 6:
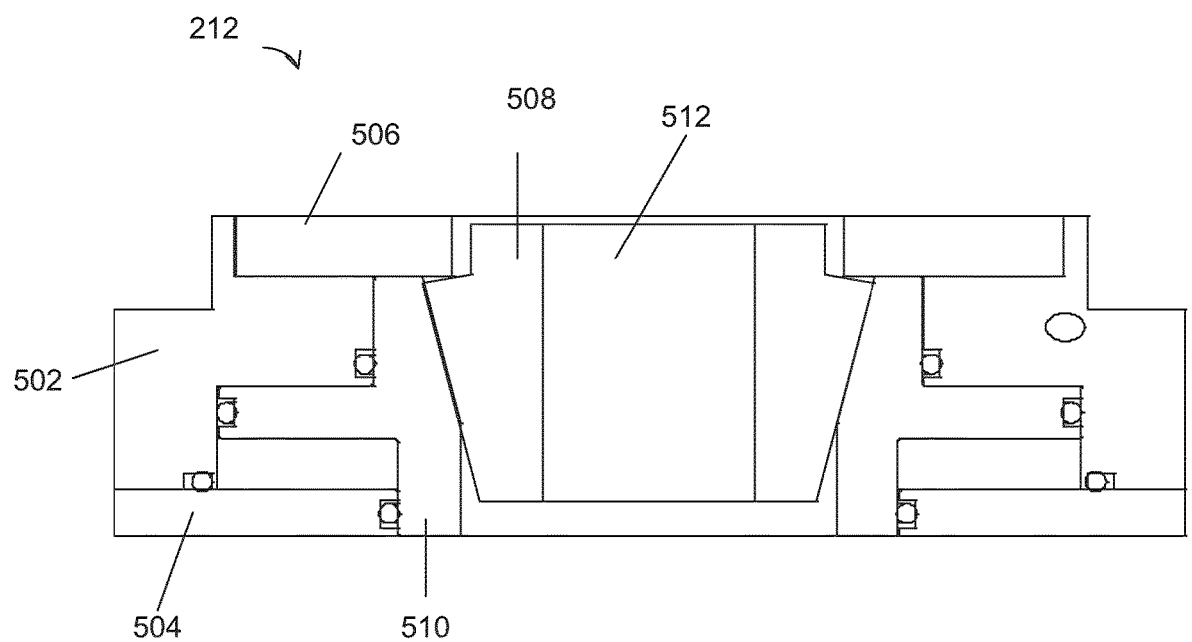

FIG. 6(a) provides a sectional view of the gripper collet 212 in the open position, and FIG. 6(b) provides a sectional view of the gripper collet 212 in the closing position. As illustrated in FIG. 6(a), the taper 510 moves downwards emptying a head space 514 between the top cover 504 and the taper 510. The sleeve 508 in turn expands into the head space 514 thereby enlarging the diameter of the opening 512 to transition into the open position. In contrast, in FIG. 6(b), the taper 510 is moved upwards into the head space 514 thereby compressing the sleeve 508 radially inwardly to move into the closing position.

Figure 7:
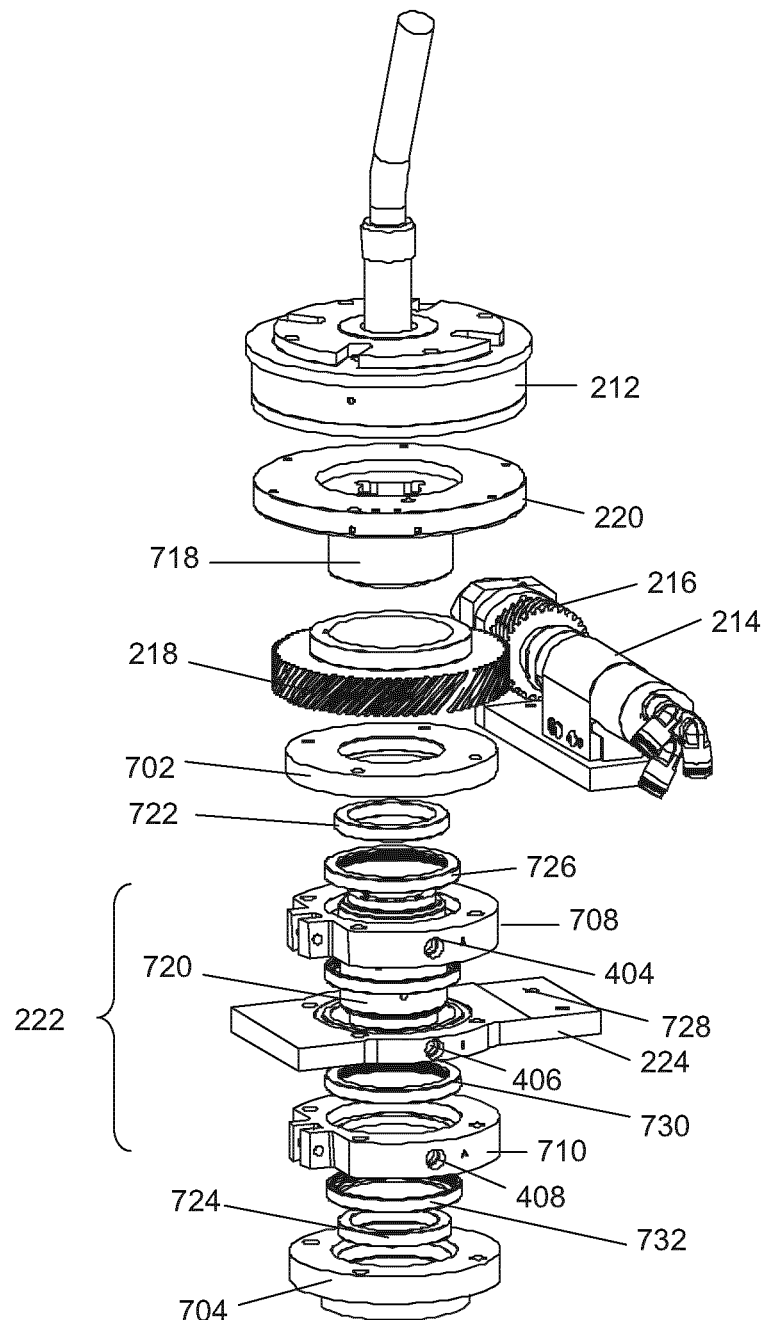
FIG. 7 is an exploded view of the second clamp, the rotary pneumatic motor, the helical gear and the air distribution assembly in accordance with one embodiment of the present invention.

FIG. 7 is an exploded view of the second clamp 212, the rotary pneumatic motor 214, the helical gears 216, 218 and the air distribution assembly 222. The air distribution assembly 222 is surrounded by an upper bearing cover 702 and a lower bearing cover 704. The air distribution assembly 222 comprises a pair of air distribution members 708, 710 with the guide plate 224 in between, each of the air distribution members 708, 710 and the guide plate 224 has a respective air inlet 404, 408, and 406. Through an application of pneumatic pressure to the respective air inlet 404, 406 and 408, the operation of the second clamp 212 can be controlled while the gear 218, the air feed plate 220 and the second clamp 212 rotate and move vertically as described above.

A hollow shaft 718, 720 is attached to the air feed plate 220. The hollow shaft 718, 720 passes through the air distribution members 708, 710 and the guide plate 224, and maintains concentric relationship thereto through bearings 722, 724. The air distribution members 708, 710 and the guide plate 224 may rotate relative to the hollow shaft 718, 720. Seal members 726, 728, 730, 732 are provided to each of the distribution members 708, 710 and the guide plate 224. When pneumatic pressure is applied, for example, to the air inlet 408, an air pocket in the form of a ring is formed between the distribution members 710, the shaft 720, the seals 730, 732 and around the shaft 718.

Figure 8:
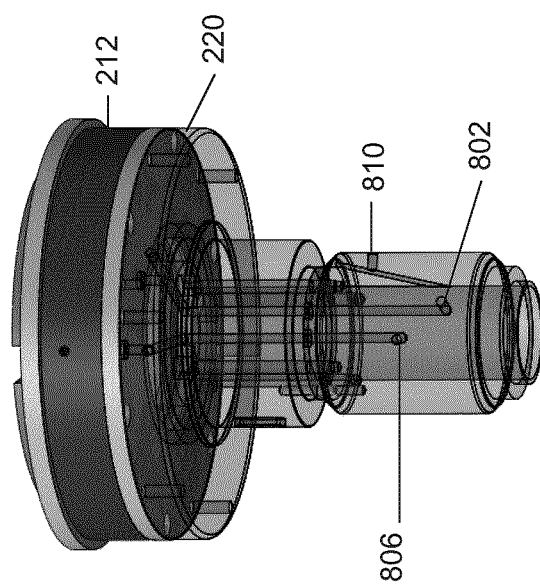
FIG. 8 shows a plurality of ducts embedded in the wall of the hollow shaft attached to the air distribution assembly.

Also referring to FIG. 8, a plurality of ducts are embedded in the wall of the hollow shaft 718, 720. A duct 802 links the ring-shaped air pocket created when pneumatic pressure is applied to the air inlet 408 with the air feed plate 220, and causes the sleeve 508 to close. A duct 806 links the ring-shaped air pocket created when pneumatic pressure is applied to the air inlet 406 with the air feed plate 220, and causes the sleeve 508 to open.

Figure 9A:
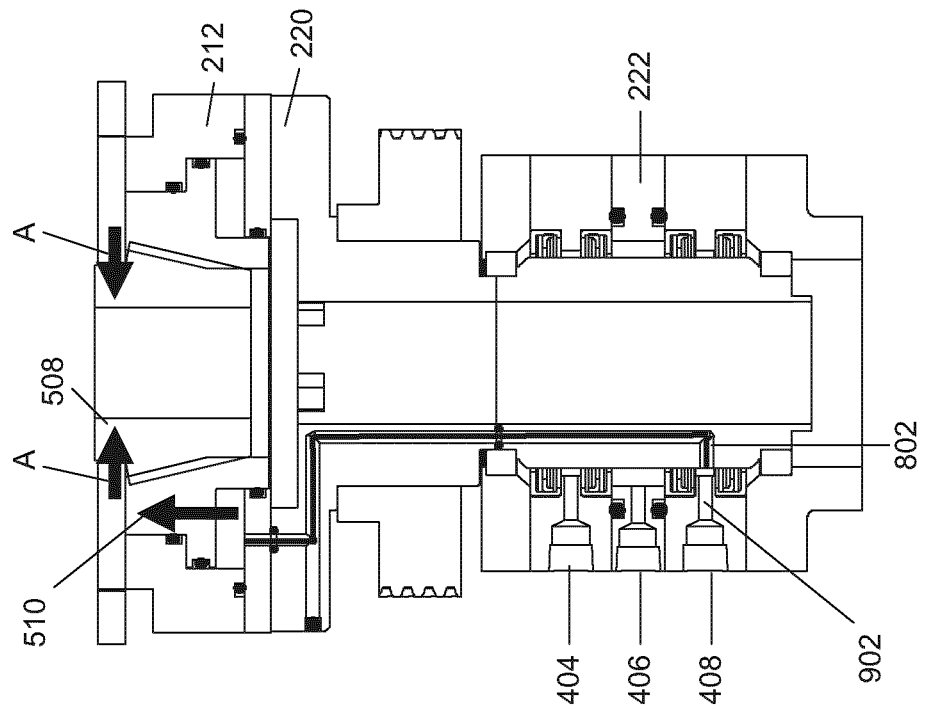
FIGS. 9(a)-9(c) are sectional views of the air distribution assembly.
Figure 9C:
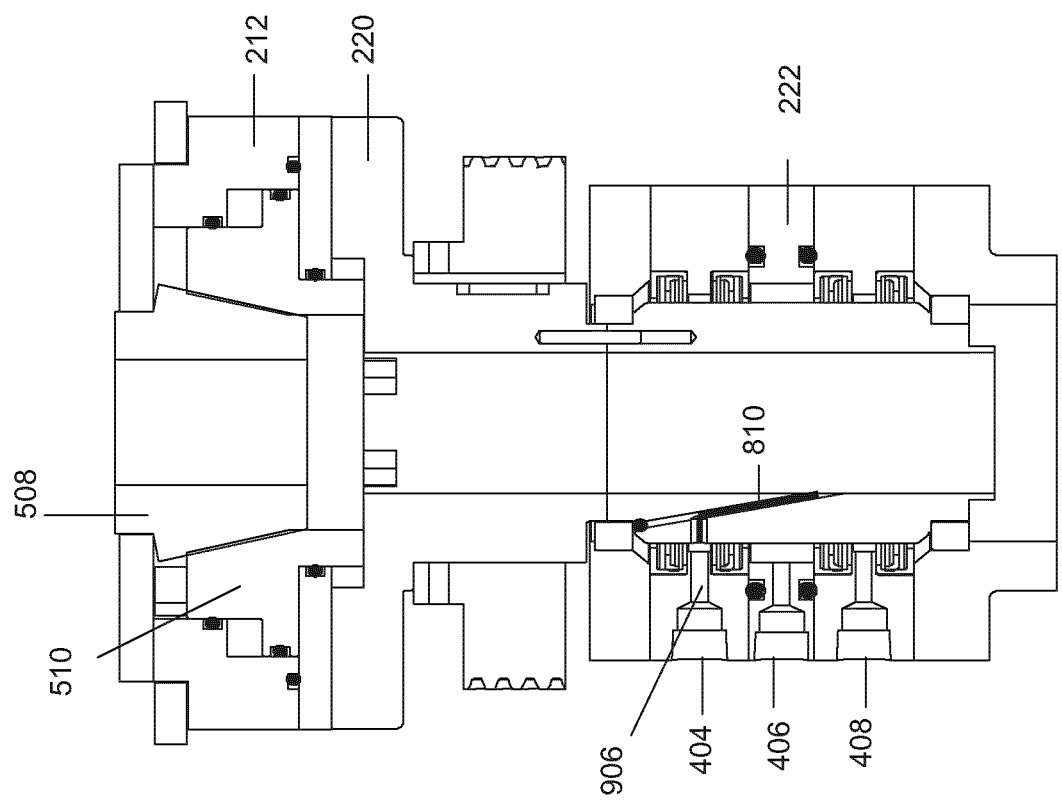
Figure 9B:
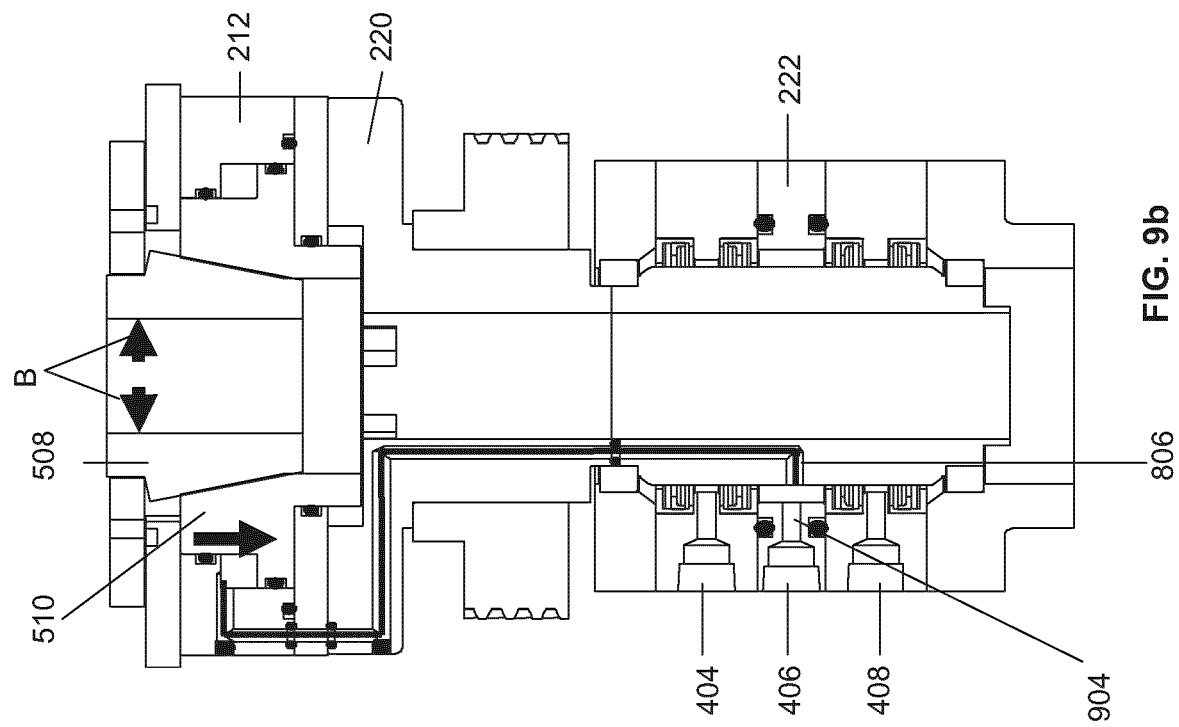

FIGS. 9(a)-9(c) provide sectional views of gripper collet 212 operated through air inlets 404, 406, 408 from the air distribution assembly 222, in accordance with one embodiment of the present invention.

In FIG. 9(a), pneumatic pressure is applied to the air inlet 408. The pressure in the ring-shaped air pocket 902 around the shaft is transferred through the duct 802 and the air feed plate 220, causing the taper 510 to move upwardly and in turn compress the sleeve 508 inwardly to the closing position, as depicted by arrows A in FIG. 9(a).

In FIG. 9(b), pneumatic pressure is applied to the air inlet 406. The pressure in the ring-shaped air pocket 904 around the shaft is transferred through the duct 806 and the air feed plate 220, causing the taper 510 to move downwardly and in turn release the sleeve 508 outwardly to the open position, as depicted by arrows B in FIG. 9(b).

In FIG. 9(c), pneumatic pressure is applied to the air inlet 404. The pressure in the ring-shaped air pocket 906 around the shaft causes the air to enter duct 810, resulting in a venturi effect and creating a low pressure region in the hollow shaft. The low pressure will vacuum the spatter dislocated from the nozzle 108 through the bore of the hollow shaft.

Figure 10:
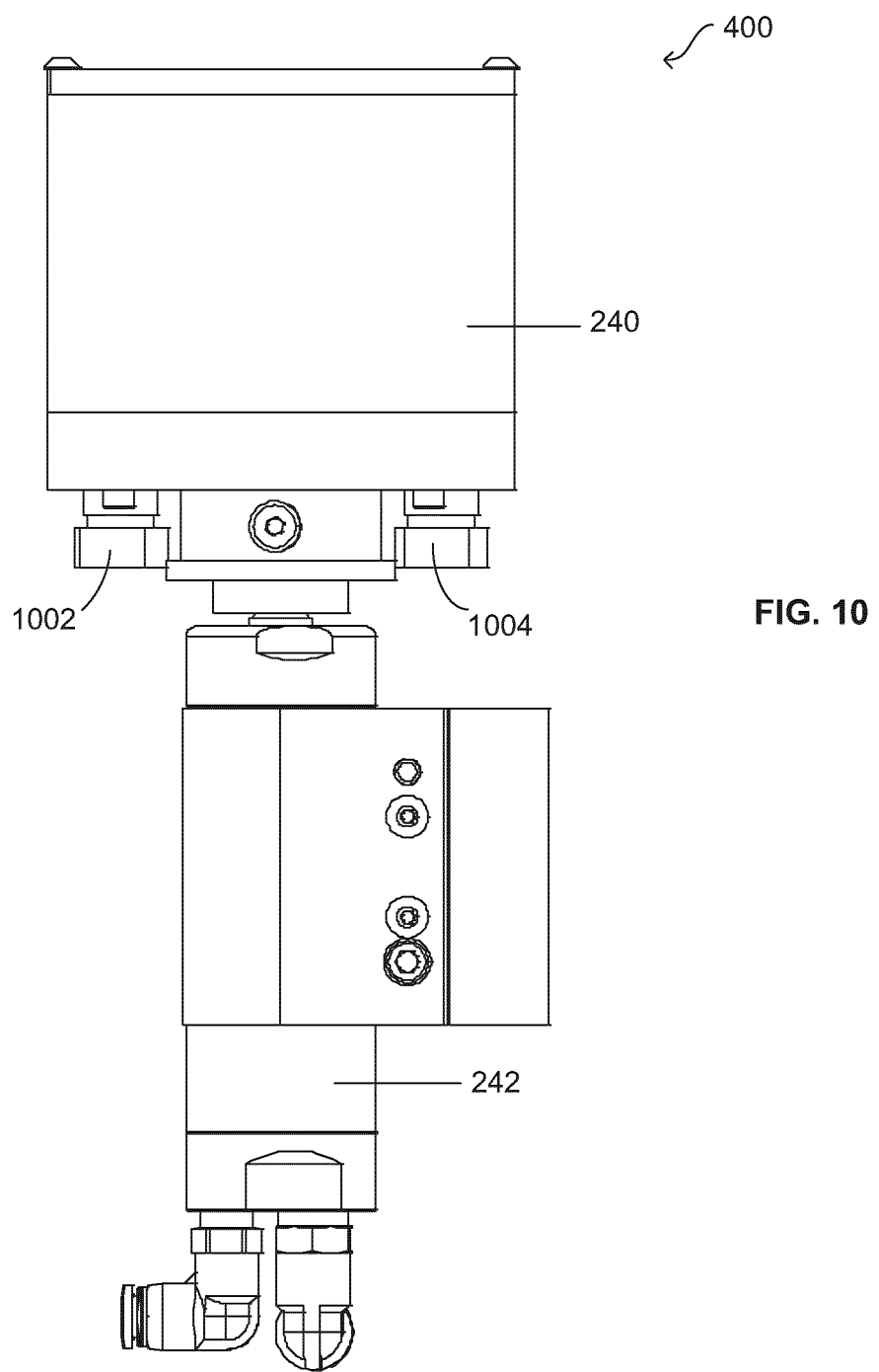
FIG. 10 shows a diffuser cleaning module in accordance with one embodiment of the present invention.

Once the nozzle 108 is removed from the welding torch 102, the robotic arm may send the welding torch 102 for cleaning of the welding tip 106 and/or the diffuser 110. FIG. 10 illustrates the diffuser cleaning module, indicated as 400, of the welding torch maintenance center, according to one embodiment of the invention. In accordance with this embodiment, the diffuser cleaning module 400 includes the tip/diffuser cleaning assembly 240, and a pneumatic air motor 242.

Figure 11:
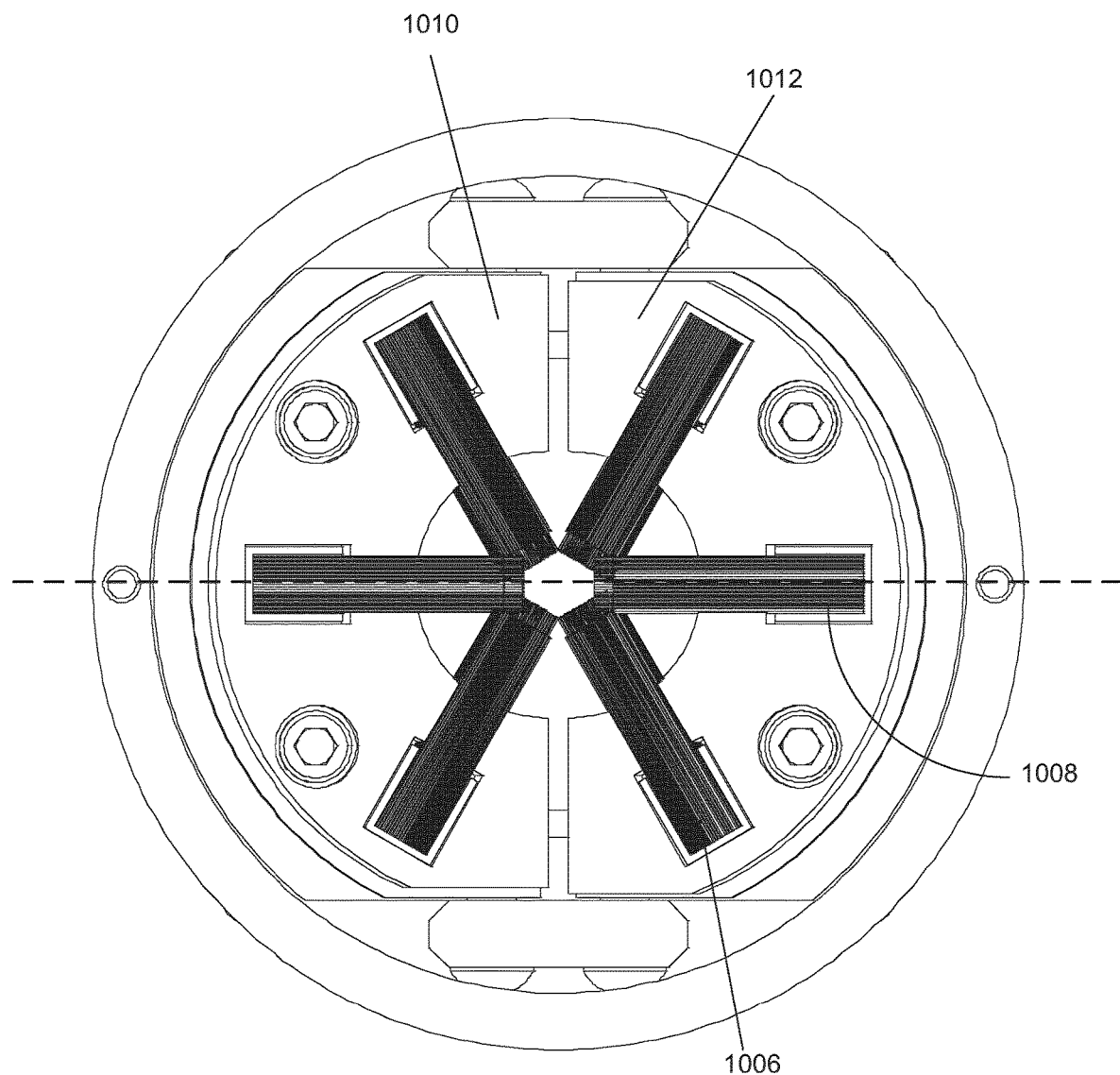
FIG. 11 is a top view of the diffuser cleaning module of FIG. 10.

FIG. 11 provides a top view of the diffuser cleaning module 400, including a diffuser cleaning means 1006, for example, a brush, or a reamer. The diffuser cleaning means 1006 may comprise a plurality of brushes 1008. In the illustrated example, the brushes 1008 are arranged on the interior surfaces of a pair of brush support frames 1010, 1012. The brushes 1008 extend inwardly to a distance to engage the diffuser 110 and the tip 106.

Figure 12:
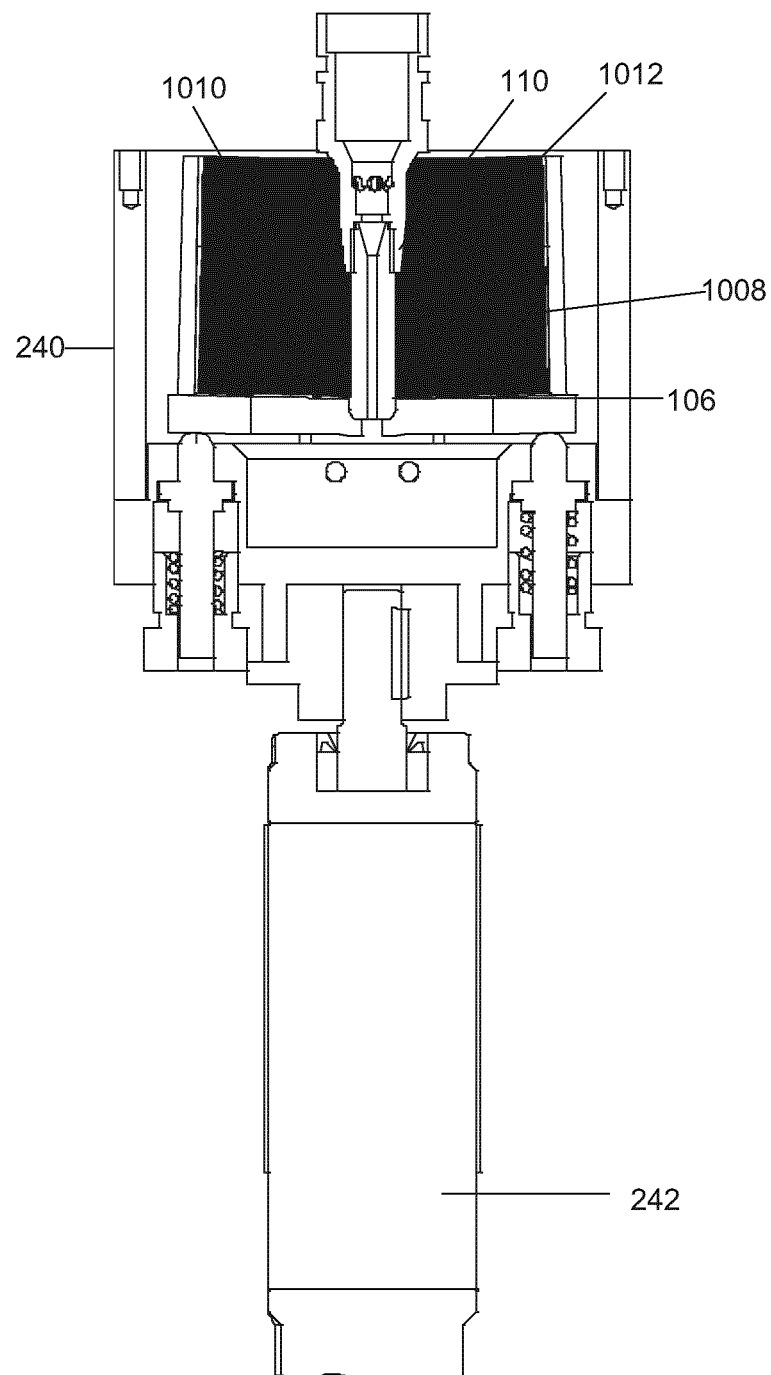
FIG. 12 is a sectional view of the diffuser cleaning module of FIG. 10.

FIG. 12 provides a sectional view of the diffuser cleaning module 400 according to the embodiment as illustrated in FIG. 10. In operation, the diffuser 110 and the welding tip 106 may be fixed at a three-dimensional reference point. The tip/diffuser cleaning assembly 240 is caused to rotate, for example via air inlets 1002, 1004. The brushes 1008 together with outside housing of the tip/diffuser cleaning assembly 240 rotates about the axis defined by the diffuser 110 and the welding tip 106. The relative movement between the brushes 1008 and the welding tip/diffuser dislocates spatters accumulated around the welding tip/diffuser, particularly around the holes 112 of the diffuser 110.

Figure 13:
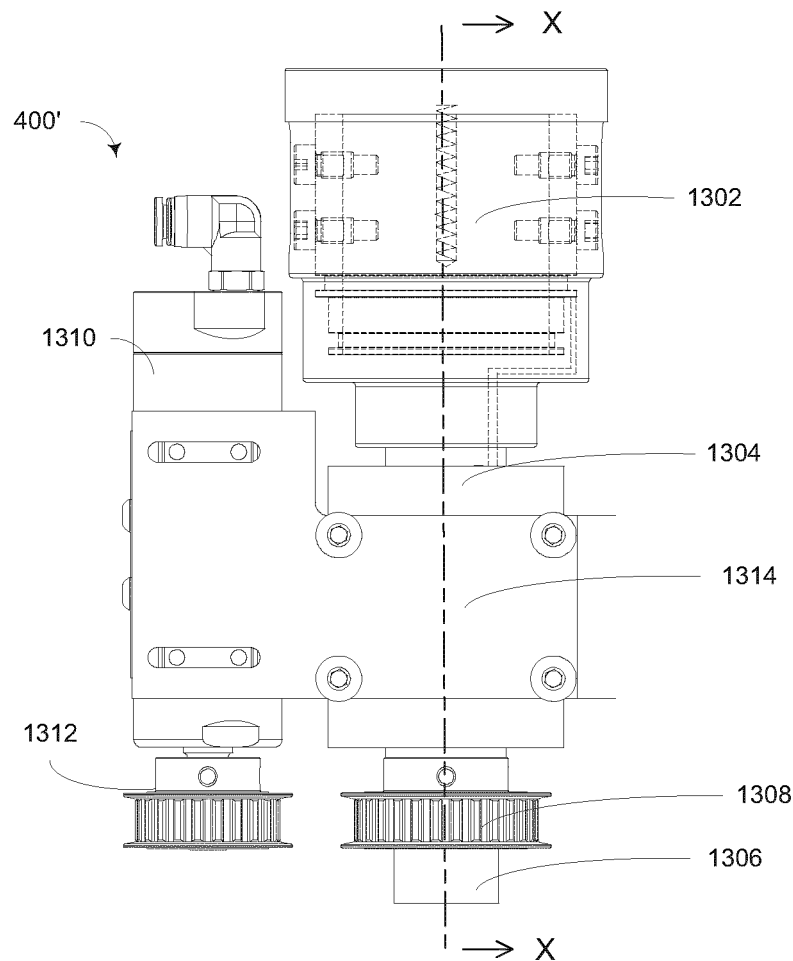
FIG. 13(a) shows a diffuser cleaning module in accordance with another embodiment of the present invention.
FIG. 13(b) is a top perspective view of the diffuser cleaning module of FIG. 13(a)
FIGS. 13(c), 13(d), 13(e) and 13(f) are sectional views of the diffuser cleaning module of FIG. 13(a)
Figure 13:
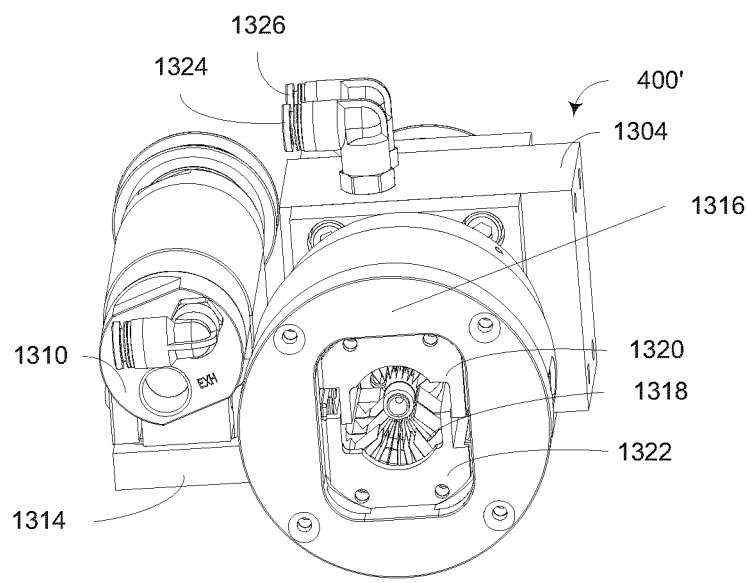
Figure 13:
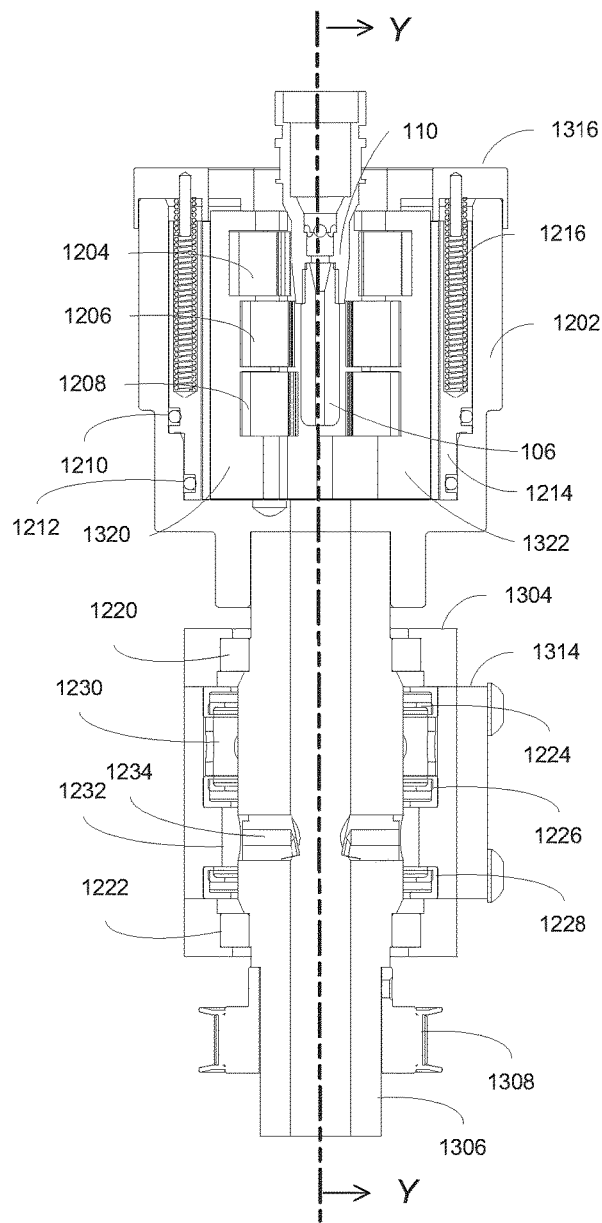
Figure 13:
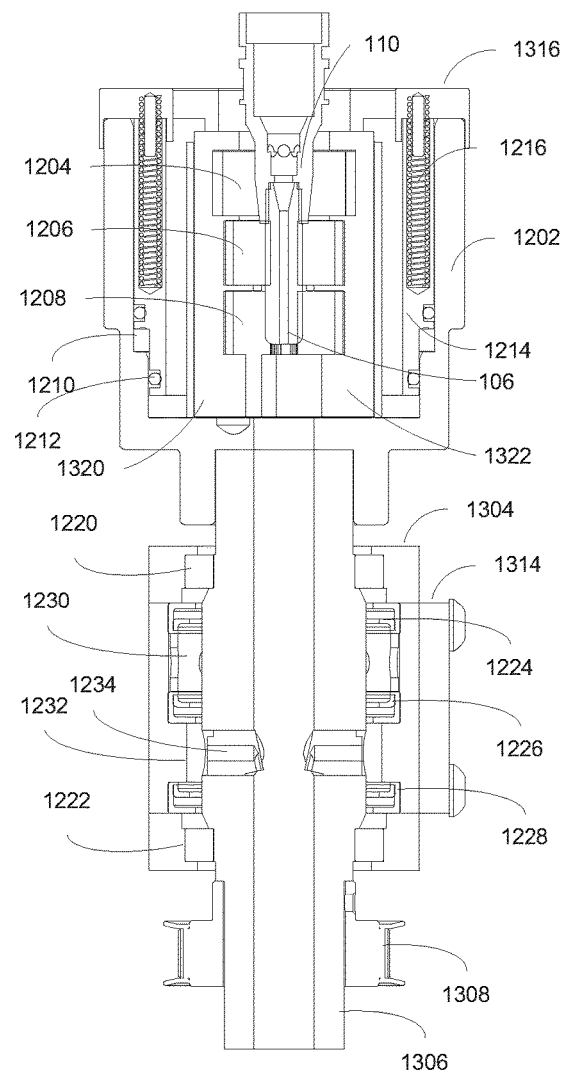
Figure 13:
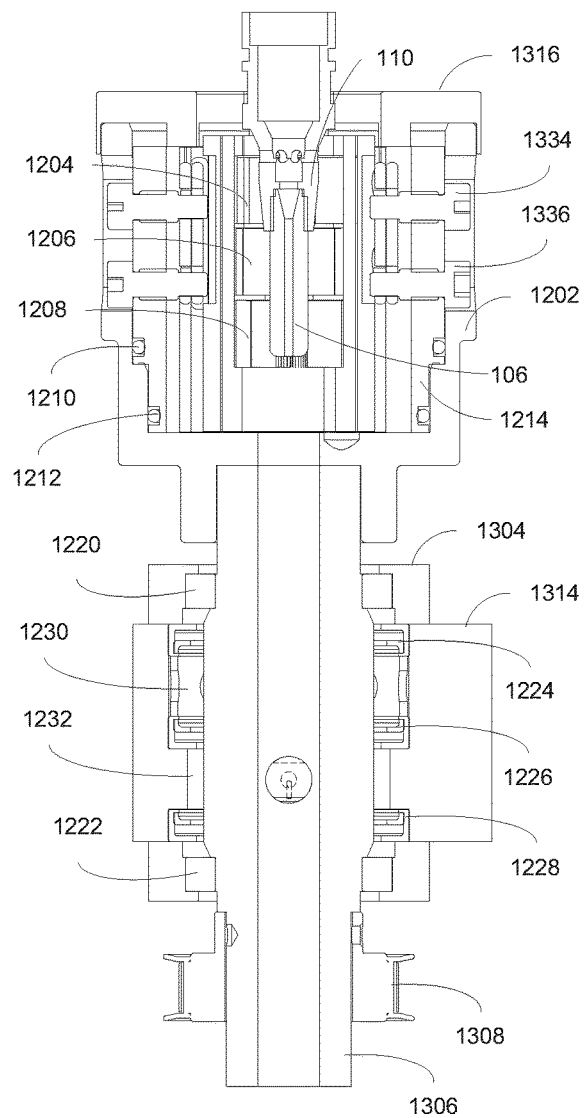
Figure 13:
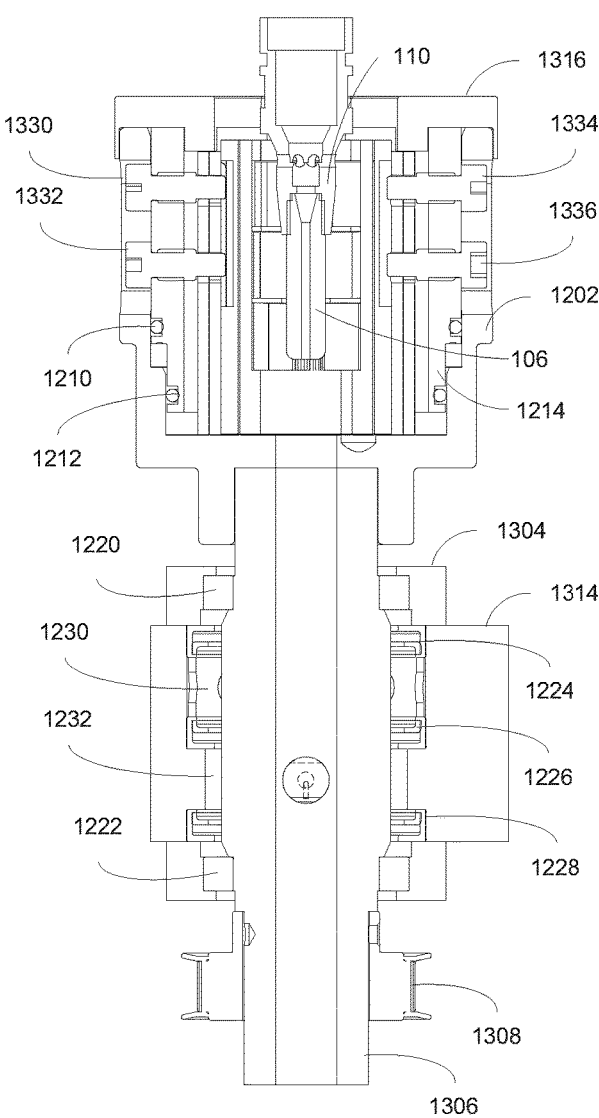
Figure 14:
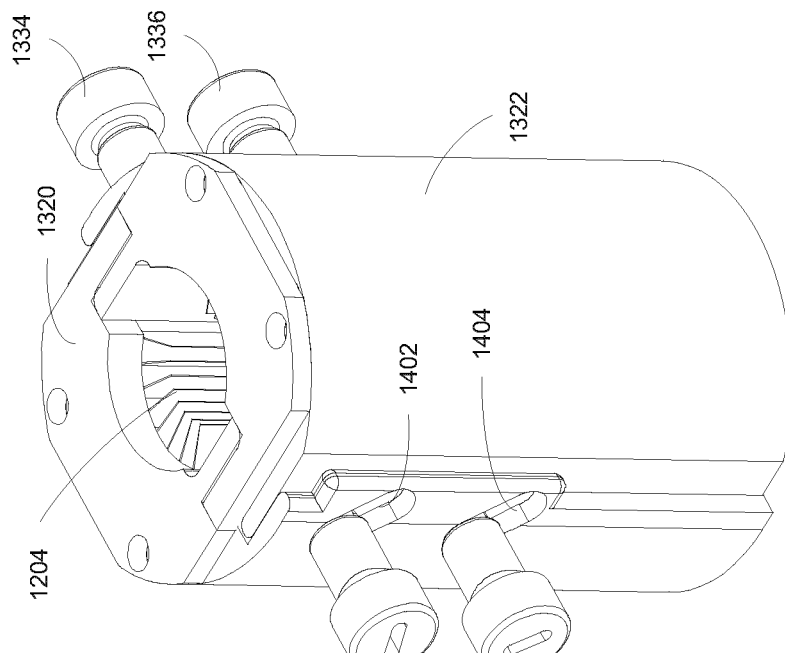
FIGS. 14(a) and 14(b) show positions of brush support frames of the diffuser cleaning module in accordance with one embodiment of the present invention.
Figure 14:
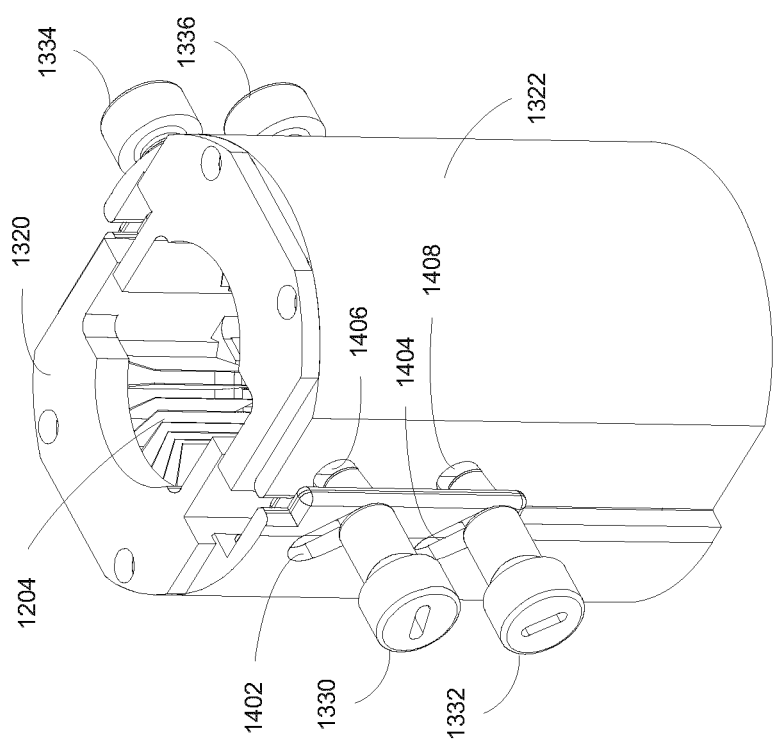

FIG. 13-FIG. 14 illustrate a diffuser cleaning module 400', according to another embodiment of the invention. In this embodiment, the diffuser cleaning module 400' includes a tip/diffuser cleaning assembly 1302, a vacuum assembly 1304, and a hollow shaft 1306. A pulley 1308 is provided on the hollow shaft 1306 and may be driven by a rotary pneumatic motor 1310, through a second pulley 1312 attached to the rotary pneumatic motor 1310 and a belt (not shown). The rotary pneumatic motor 1310 and the vacuum assembly 1304 are mounted on a back plate 1314.

FIG. 13(b) is a top perspective view of the diffuser cleaning module 400'. A top cap 1316 encloses the diffuser cleaning means, for example a brush, a reamer or a milling means. The diffuser cleaning means may comprise a plurality of brushes 1318. In the illustrated example, the brushes 1318 are arranged on the interior surfaces of a pair of brush support frames 1320, 1322. The brush support frames 1320, 1322 carrying the brushes 1318 may be extendable to engage the diffuser 110 and the welding tip 106 with different diameters. Pneumatic pressure is provided to two air inlets 1324, 1326, one air inlet for generating a low pressure region inside the hollow shaft 1306, and the other air inlet for causing the movement of the brush support frames 1320, 1322.

FIGS. 13(c) and 13(d) are sectional views, taken by lines X-X in FIG. 13(a), of the diffuser cleaning module 400'. The diffuser 110 and the welding tip 106 may be fixed at a single three-dimensional reference point. As depicted in FIGS. 13(c) and 13(d), the brushes may be provided in three groups 1204, 1206, 1208 along the axis defined by the diffuser 110 and the welding tip 106 so that the distance between the blades of group 1204 is slightly larger than that of groups 1206, 1208. The diffuser cleaning module 400' includes an outside housing 1202. Inside the housing 1202 and arranged in sealed relationship through o-rings 1210, 1212 is a piston 1214. The piston 1214 is biased towards the bottom of the outside housing 1202 by a resilient means, for example, a spring 1216. The hollow shaft 1306 may be caused to rotate, for example as illustrated in FIG. 13(a), by a rotary pneumatic motor 1310, the pulleys 1308 and 1312 and a timing belt (not shown). The hollow shaft 1306 causes the outside housing 1202 and the brushes 1204, 1206, 1208 to rotate about the axis defined by the diffuser 110 and the welding tip 106.

The hollow shaft 1306 is supported by two bearings 1220, 1222 of the vacuum assembly 1304. Three seals 1224, 1226, 1228 are provided between the hollow shaft 1306 and the vacuum assembly 1304. When pneumatic pressure is applied to the inlets 1324, 1326, two ring-shaped air pockets 1230, 1232 may be formed around the hollow shaft 1306. In the illustrated embodiment, the inlet 1324 is in pneumatic communication with the air pocket 1230. Through an air duct (not shown) in the hollow shaft 1306, the air pocket 1230 is also in pneumatic communication with the outside housing 1202. Referring to FIG. 13(d), when pneumatic pressure is applied to the inlet 1324, the pressure in the ring-shaped air pocket 1230 around the shaft 1306 is transferred to piston 1214. The piston 1214 is urged to move upwards, as will be described below, the brush support frames 1106, 1108 are caused to move closer so that the reaming blades 1204, 1206, 1208 engage the diffuser 110 and the welding tip 106.

The air outlet 1234 is in pneumatic communication with the second inlet 1326. When pneumatic pressure is applied to the air inlet 1326, the pressure in the ring-shaped air pocket 1232 around the shaft 1306 causes the air to enter the air outlet 1234, resulting in a venturi effect thereby creating a low pressure region inside the hollow shaft 1306. The low pressure will vacuum the spatter dislocated from the diffuser 110 and/or the welding tip 106 through the bore of the hollow shaft 1306.

FIGS. 13(*e*) and 13(*f*) are sectional views, taken by lines Y-Y in FIG. 13(*c*) of the diffuser cleaning module 400'. FIGS. 13(*e*) and 13(*f*) correspond to FIGS. 13(*c*) and 13(*d*), respectively.

In FIGS. 13(*e*) and 13(*f*), two pairs of pins 1330, 1332, 1334, 1336 are positioned on opposite sides of the piston 1214. As the piston 1214 is urged upwards by pneumatic pressure, the pins 1330, 1332, 1334, 1336 are also lifted in FIG. 13(*f*).

FIG. 14(*a*) shows the relative position of the brush support frames 1320, 1322 when the pins 1330, 1332, 1334, 1336 are in a lower position, i.e. when the piston 1214 is urged by the springs 1216; while FIG. 14(*b*) shows the relative position of the brush support frames 1320, 1322 when the pins 1330, 1332, 1334, 1336 are in an elevated position, i.e. when the piston 1214 is lifted by the pneumatic pressure supplied through the inlet 1324.

The support frame 1320 has four angled slots, two of them being depicted in FIG. 14(*a*) as slots 1402, 1404, and the support frame 1322 also has four angled slots, two of them being depicted in FIG. 14(*a*) as slots 1406, 1408. As illustrated in FIG. 14(*a*), when the piston is in the lower position, the pin 1330 is at the bottom of a V-shape slot collectively formed by the angled slots 1402 and 1404; likewise the pin 1332 is at the bottom of the V-shape collectively formed by the angled slots 1404 and 1408.

The pins 1330, 1332 are slidable in guided relations along the confines of the angled slots 1402, 1406, 1404, 1408. When the pins 1330, 1332 are urged upwards by the pneumatic pressure, the top ends of the V-shapes are caused to move closer, resulting in the support frame 1320, 1322 moving together as illustrated in FIG. 14(*b*).

Figure 15:
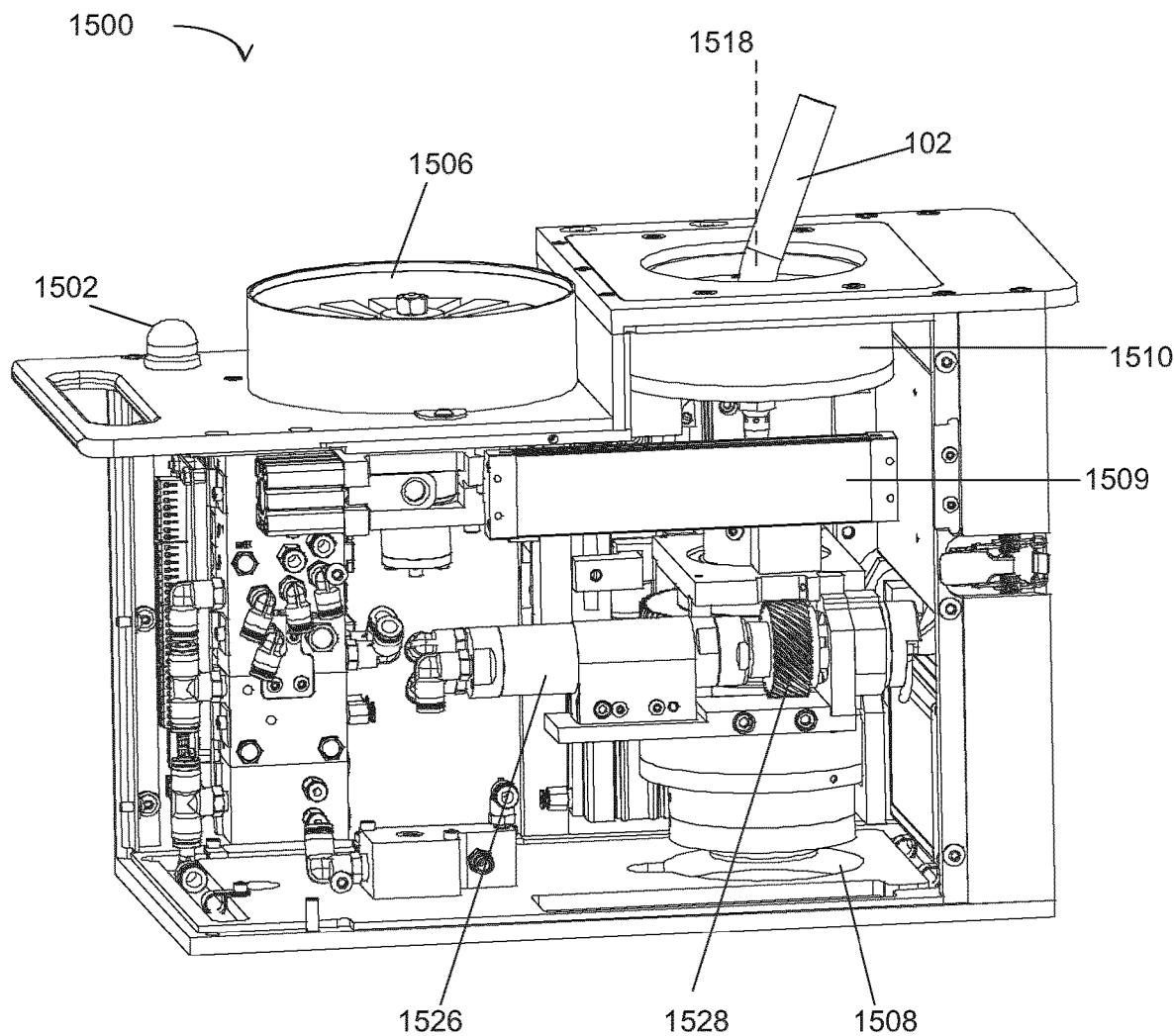
FIG. 15(a) is a left side view of a welding tip changing apparatus in accordance with one embodiment of the present invention.
FIG. 15(b) is a right side view of the welding tip changing apparatus of FIG. 15(a)
Figure 15:
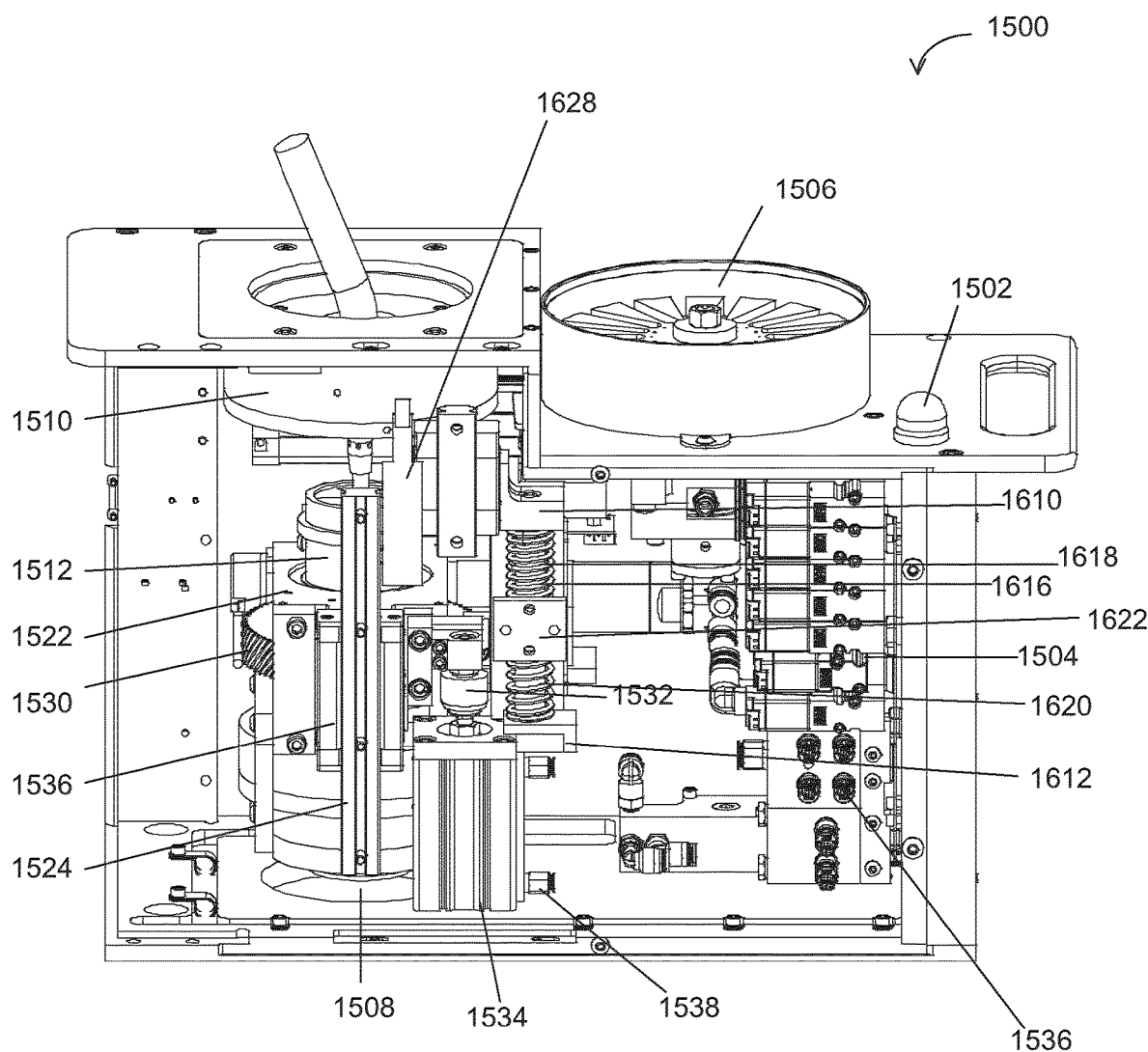

FIGS. 15(*a*)-15(*b*) illustrate a welding tip changing apparatus, indicated as 1500, in accordance with one embodiment of the present invention. In particular, FIG. 15(*a*) shows a left side view of the welding tip changing apparatus 1500 and FIG. 15(*b*) shows a right side view thereof. In this embodiment, the welding tip changing apparatus 1500 is formed as an apparatus separate from the welding torch maintenance apparatus 200. It will be apparent to a person skilled in the art that the welding tip changing apparatus 1500 and the welding torch maintenance apparatus 200 may be formed within a single enclosure.

Welding tips 106 wear after a certain period of use and may be unacceptable for continued use due to their construction. The time period to replace welding tips 106 may be based on the time the welding torch 102 is in use, or the amount of welding wire which has been fed through the welding tip 106. Following the removal of the nozzle 108 and the cleaning of the diffuser 110 and/or the welding tip 106 at the welding torch maintenance apparatus 200, the robotic arm carrying the welding torch 102 may be positioned to a welding tip changing apparatus 1500, where the welding tip 106 can be removed and replaced.

In the illustrated embodiment of FIGS. 15(*a*) and 15(*b*), the welding tip changing apparatus 1500 includes a welding tip changer module 1508 for removing a used welding tip and attaching a new or replacement welding tip. The welding tip changing apparatus 1500 may generally include a status light 1502 to indicate its operation status, valve banks 1504 for controlling the operations of the various pneumatic drive means, and a welding tip magazine 1506 for storing new or replacement welding tips.

Referring to FIGS. 15(*a*) and 15(*b*), the welding tip changer module 1508 includes a first clamp 1510 and a second clamp 1512. The first clamp 1510 is adapted to receive and fasten the diffuser 110 of the welding torch 102. The first clamp 1510 may include a plurality of moveable, cooperative gripping inserts, for example, jaws of a collet, to receive and fasten the diffuser 110 in a releasably clamped relation therebetween. In general, the gripping inserts are in an equidistant spaced relation around a rotational axis 1518 and centers the welding tip 106 of the welding torch 102 with respect to the rotational axis 1518.

The second clamp 1512 is provided for holding the welding tip 106 and may have a similar or identical structure as the first clamp 1512. In one exemplary embodiment, the second clamp 1512 is a collet comprising a plurality of jaws arranged in an equidistantly spaced relation around a central axis which is aligned with the rotational axis 1518, for clamping the welding tip 106. The second clamp 1512 is movable between a closing position, in which gripping inserts are extended to clamp and hold the welding tip 106, and a retracted and open position wherein gripping inserts are positioned out of the closing relation. The second clamp 1512 is further adapted to rotate about and move along the rotational axis 1518, as will be described below. It will be apparent to a person skilled in the art that other implementations for the first clamp 1510 or the second clamp 1512 are readily available, for example, other pneumatically or electrically controlled clamps, or a locking slider, for holding the diffuser 110 and the welding tip 106.

Figure 16:
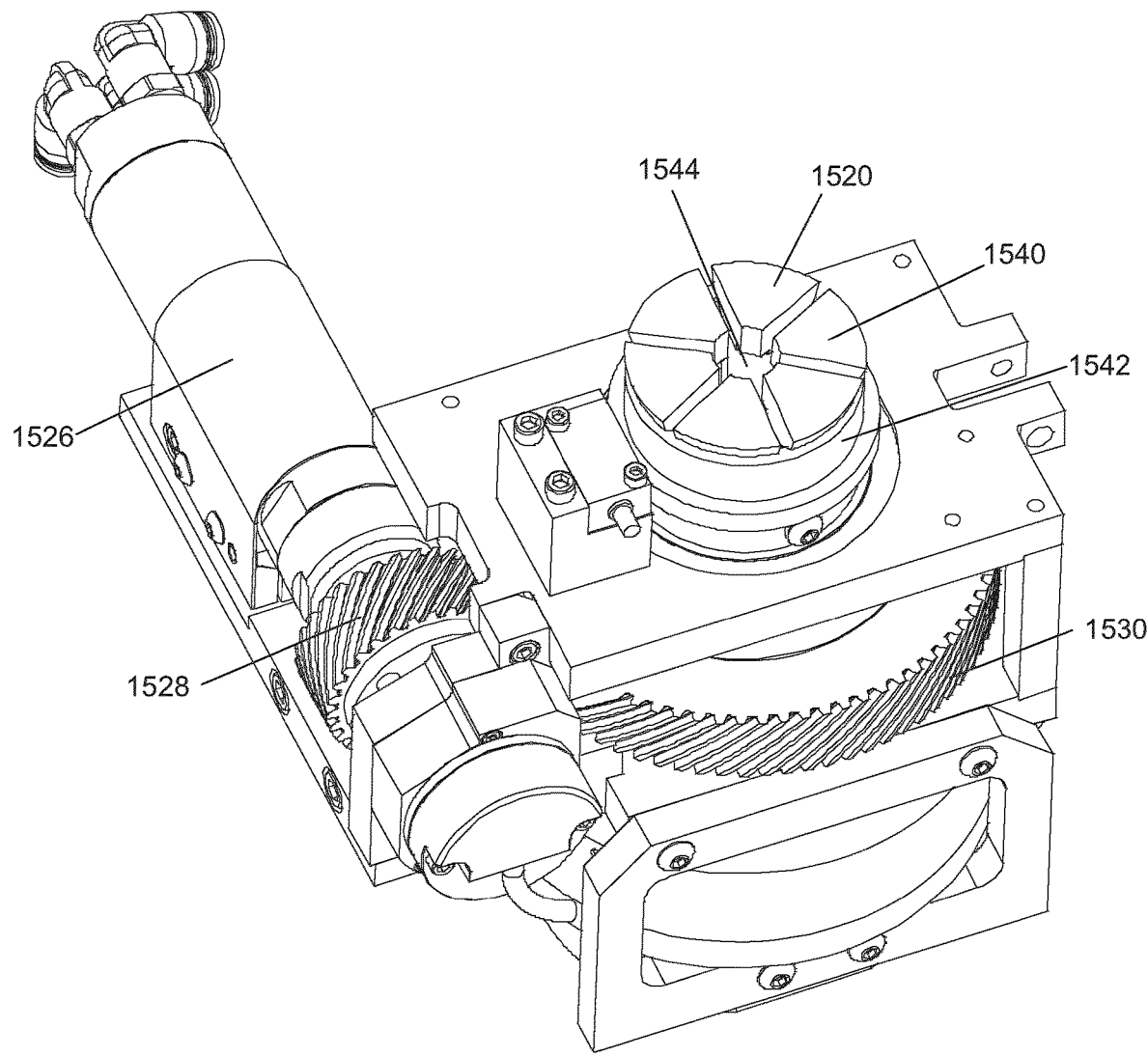
FIG. 16(a) is a top perspective view of the welding tip changing apparatus when the second clamp is in an open position.
FIG. 16(b) is a top perspective view of the welding tip changing apparatus when the second clamp is in a closing position.
Figure 16:
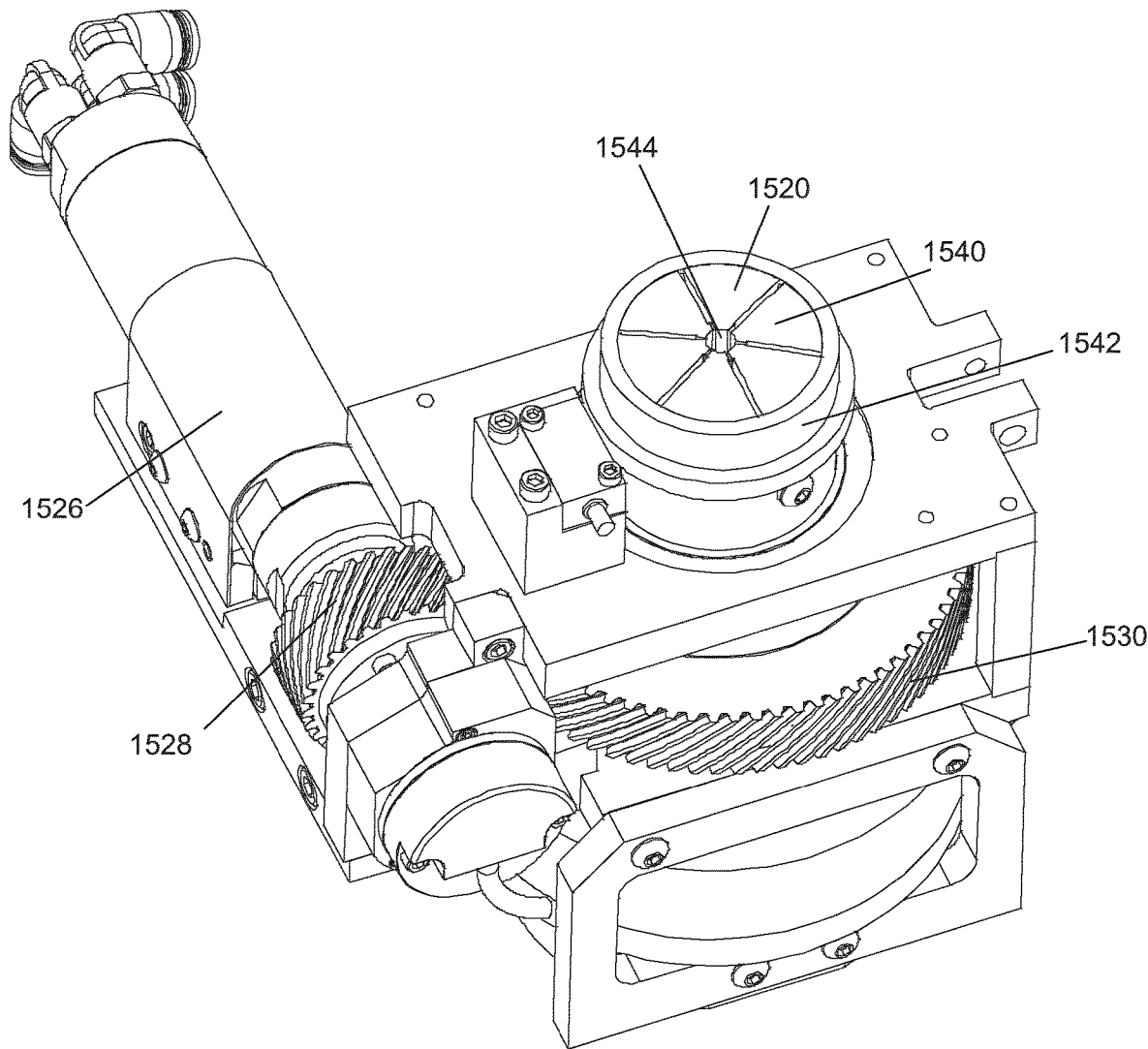

FIGS. 16(*a*) and 16(*b*) provide one exemplary embodiment of the second clamp 1512, in the form of a collet 1520. FIG. 16(*a*) illustrates the collet 1520 in an open position where the plurality of jaws 1540 have moved downwardly and outwardly with respect to a matching taper 1542 to enlarge the diameter of the opening 1544. In comparison, FIG. 17(*b*) illustrates the collet 1520 in a closing, clamping position where the plurality of jaws 1540 have moved upwardly and inwardly with respect to the matching taper 1542 to reduce the diameter of the opening 1544. The jaws 1540 of the collet 1520 generally transition from the closing position to the open position, when the used welding tip 106 is removed from the welding torch 102, at which time the welding tip 106 is released from the collet 1520, either dropped through the hollow space below the collet 1520 or removed by other means. The jaws 1540 of the collet 1520 generally transition from the open position to the closing position, when a new tip is delivered from the welding tip magazine 1506 to be attached to the welding torch 102.

Figure 17:
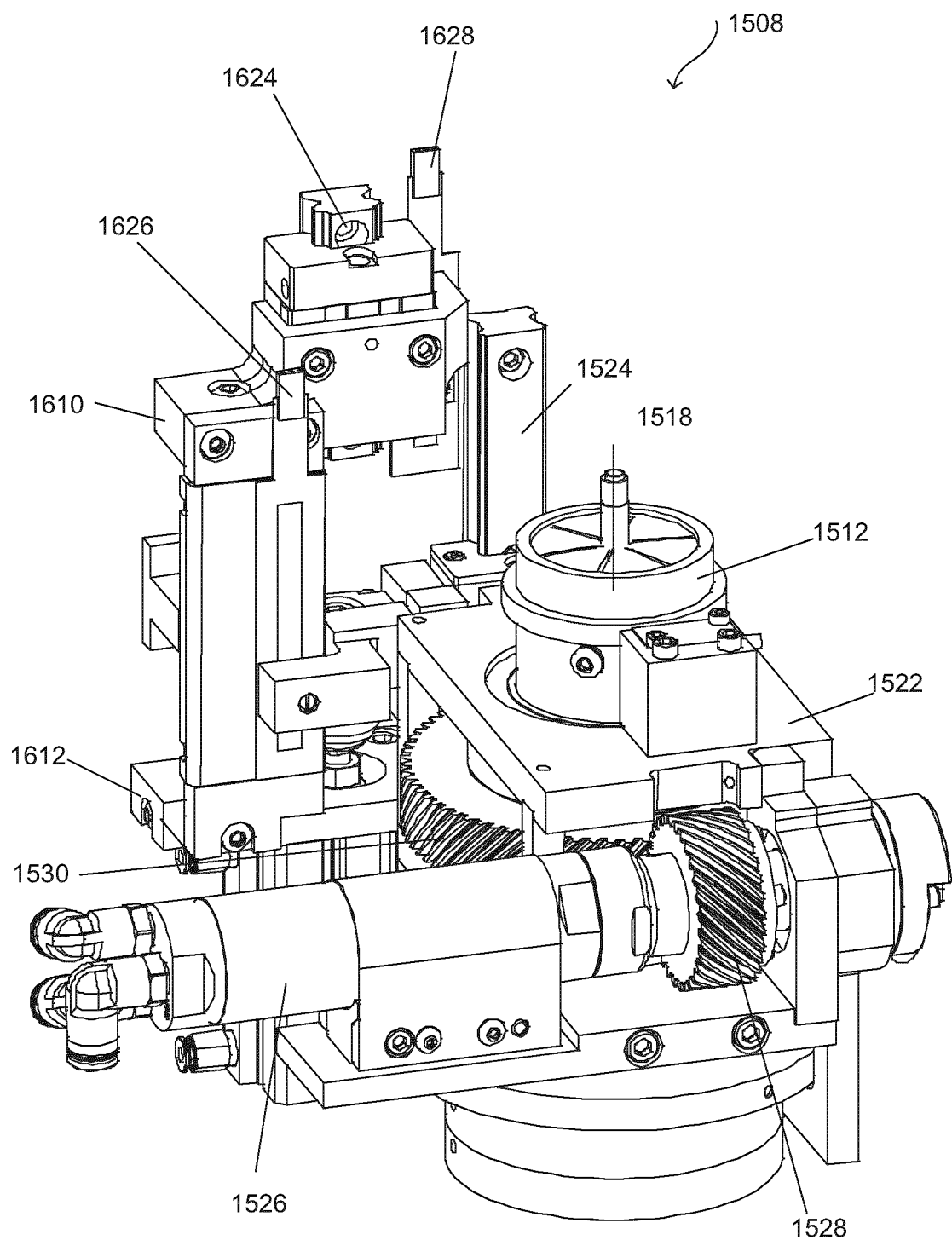
FIG. 17(a) is a perspective view of the welding tip changer module in accordance with one embodiment of the present invention.
FIG. 17(b) is another perspective view of the welding tip changer module of FIG. 17(a)
FIG. 17(c) is a perspective view of the welding tip changer module in accordance with another embodiment of the present invention.
Figure 17:
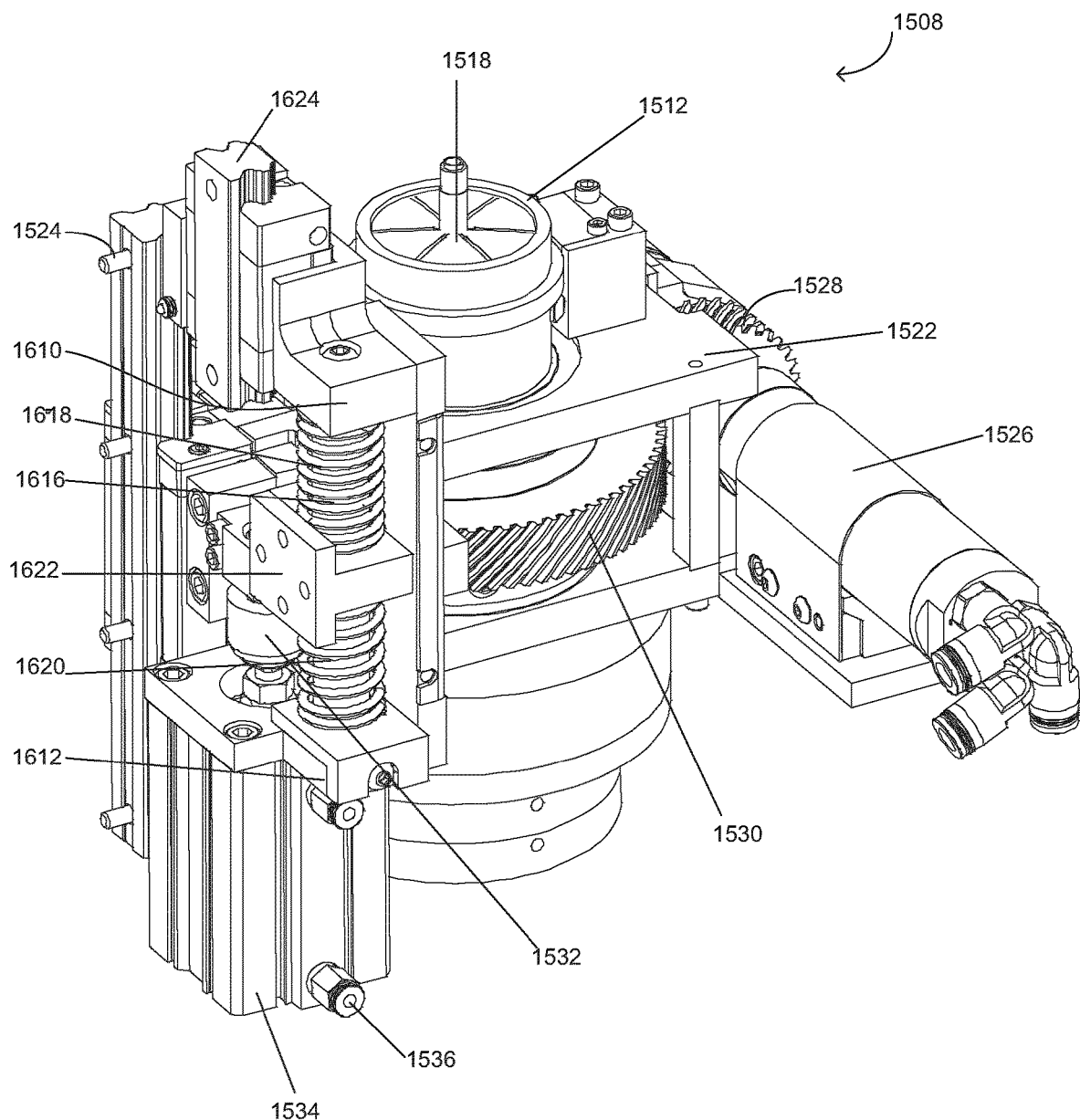
Figure 17:
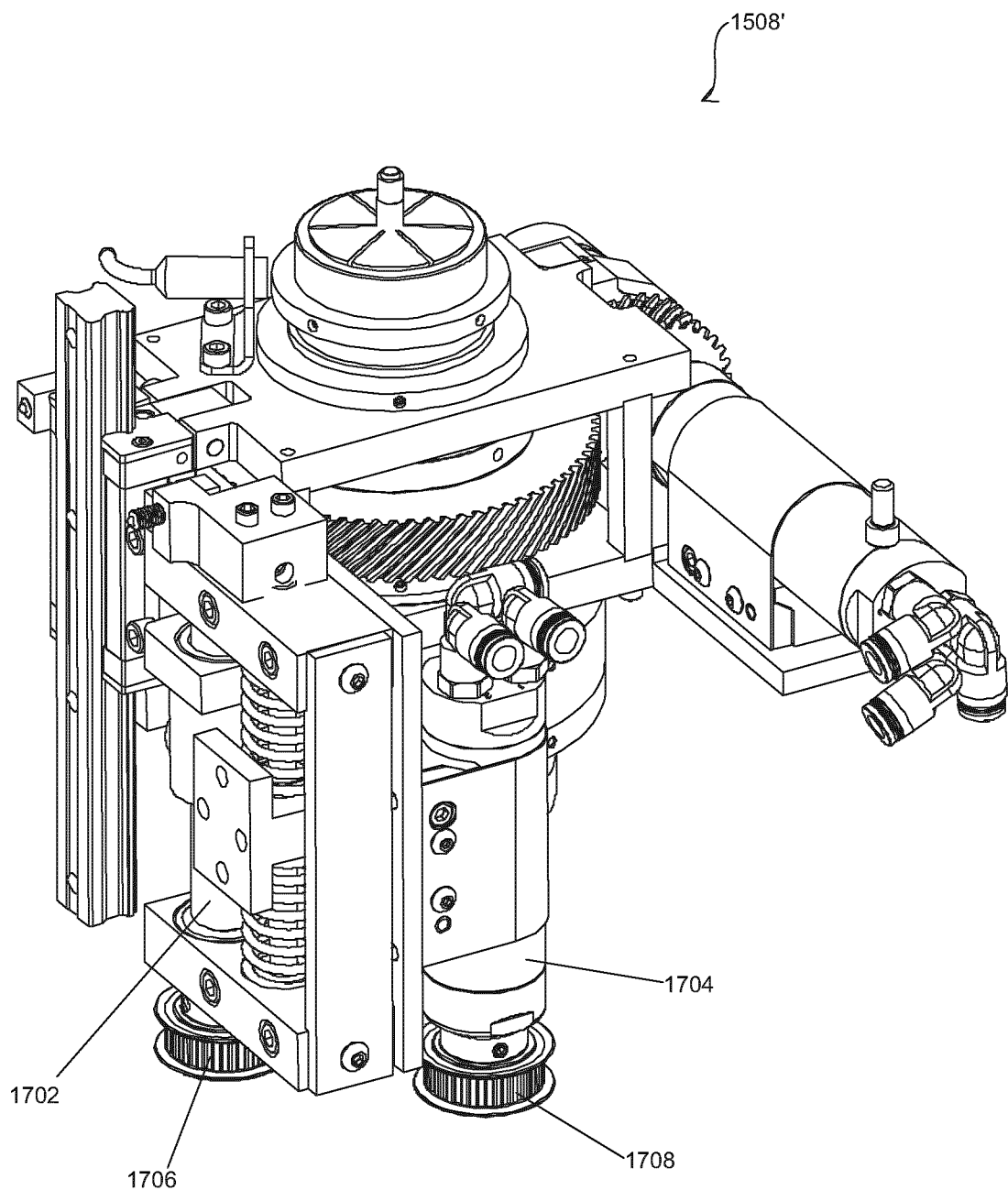

FIGS. 17(*a*) and 17(*b*) show the welding tip changer module 1508 of the welding tip changing apparatus 1500, in accordance with one embodiment of the invention. The welding tip changer module 1508 includes a drive means for rotating the second clamp 1512. In the illustrated embodiment, the drive means includes a horizontal rotary pneumatic motor 1526 and a horizontal helical gear 1530 and a connecting small helical gear 1528. The horizontal helical gear 1530 is connected to the second clamp 1512 so that the horizontal helical gear 1530 and the second clamp 1512 rotate about the rotational axis 1518 when driven by the smaller helical gear 1528 connected to the horizontal rotary pneumatic motor 1526. It will be apparent to a person skilled in the art that other implementations are readily available, for example, other pneumatic or electrical motor arrangements.

Similar to the nozzle removal module 300, the second clamp 1512 may be in pneumatic communication with an air distribution assembly which operates to open and close the second clamp 1512. The welding tip changer module 1508 further includes a lift system for moving the second clamp 1512 along the rotational axis 1518. In the illustrated embodiment in FIGS. 17(*a*) and 17(*b*), the lift system includes a cylinder 1534 operated with a dump and fill manifold 1536. In operation, the second clamp 1512 holds the welding tip 106 and rotates about the rotational axis 1518 to unthread the welding tip 106. The rotation of the second clamp 1512 may start prior to the second clamp 1512 moving into the closing position. As the second clamp 1512 holds and unthreads the welding tip 106, the second clamp 1512 is actuated vertically to detach the welding tip 106 from the welding torch 102.

The welding tip changer module 1508 includes a carriage 1522 that moves along a vertical rail 1524. In the embodiment as illustrated in FIGS. 17(*a*) and 17(*b*), the carriage 1522 secures and moves the second clamp 1512, the horizontal rotary pneumatic motor 1526 and the helical gears 1528, 1530. The carriage 1522 is attached to an alignment joint or floating connector 1532 of the cylinder 1534 and moves vertically when the cylinder 1534 is driven pneumatically via air inlets 1538. When actuated, the cylinder 1534 carrying the carriage 1522, together with the second clamp 1512, the horizontal rotary pneumatic motor 1526 and the helical gears 1528, 1530, moves in the vertical direction.

In accordance with one embodiment of the present invention, the lift system further includes a level assembly for providing a degree of movement freedom in the vertical direction. In the illustrated embodiment, the level assembly includes an upper bearing plate 1610 and a lower bearing plate 1612, collectively forming a holder member to hold the cylinder 1534. A spring rod 1616 is provided between the upper bearing plate 1610 and the lower bearing plate 1612 as support for an upper spring 1618, a lower spring 1620 and a supporting member 1622 in between the two springs 1618, 1620. Preferably, the rail 1524 and the supporting member 1622 are mounted to a rigid structure, for example, a frame member of the welding tip changing apparatus 1500. The rail 1524 provides the directional guidance so that the second clamp 1512, the rotary pneumatic motor 1526 and the helical gears 1528, 1530 moves in the vertical direction, when driven through the cylinder 1534. At the same time, the cylinder 1534 forms a unitary structure with the holder member, which can be moved relative to the supporting member 1622 along a second rail 1624. The relative movement between the holder member and the supporting member 1622 is constrained by a resilient means, in the illustrated example, the upper spring 1618 and the lower spring 1620. As a result, a degree of movement freedom is provided in the vertical direction as the holder member, along with the carriage 1522, the second clamp 1512, the rotary pneumatic motor 1526 and the helical gears 1528, 1530, may move slightly relative to the supporting member 1622 in the vertical direction.

FIG. 17(*c*) illustrates a welding tip changer module 1508', according to another embodiment of the invention. In this embodiment, the lift system includes a lead screw 1702 driven by a rotary pneumatic motor 1704. The lift system may use a first pulley 1706 at the end of the lead screw 1702, and a second pulley 1708 and a timing belt (not shown) in connection with the rotary pneumatic motor 1704. It will be apparent to a person skilled in the art that other implementations of the lift system are readily available, for example, other drive means such as electrical motor or servo motor may be used to move the carriage vertically.

The welding tip changer module 1508, 1508' provides a degree of movement freedom in the vertical direction which compensates a potential slight offset between the thread pitch of the welding tip 106 and the diffuser 110. Such a degree of freedom also provides a buffer to accommodate the rotational speed and lift rate of the second clamp 1512. As will be apparent to a person skilled in the art, the threads may likely not be aligned at the beginning of the process. Using force to remove or attach the welding tip 106 may result in cross-threading between the welding tip 106 and the diffuser 110. The vertical movement freedom provided by the holder member, the supporting member 1622, the upper spring 1618 and the lower spring 1620 acts as two-way dampeners in the vertical direction allowing the welding tip 106 being rotated by the second clamp 1512 to properly detach from or reattach to the diffuser 110.

In accordance with one embodiment of the present invention, the welding tip changer module 1508, 1508' includes movement detecting means to detect vertical movement. In the illustrated embodiments, the movement detecting means may include two potentiometers. Referring to FIG. 17(*a*), a first potentiometer 1626 is used in connection with the rail 1524 to monitor the motion of the lift system; and a second potentiometer 1628 is used in connection with the second rail 1624 to monitor the motion of the springs 1618, 1620. When the second clamp 1512 is caused to rotate, the springs 1618, 1620 begin compression, the potentiometer 1628 detects the motion. If the springs 1618, 1620 are overly compressed, the welding tip 106 may be under an excessive pressure; in such a case the potentiometer 1628 will detect the compression and the lift system will be actuated to be vertically adjusted. The lift system may be adjusted several times vertically alternating between pausing and moving, in order to optimize the spring force and to avoid thread relaxation.

Figure 18:
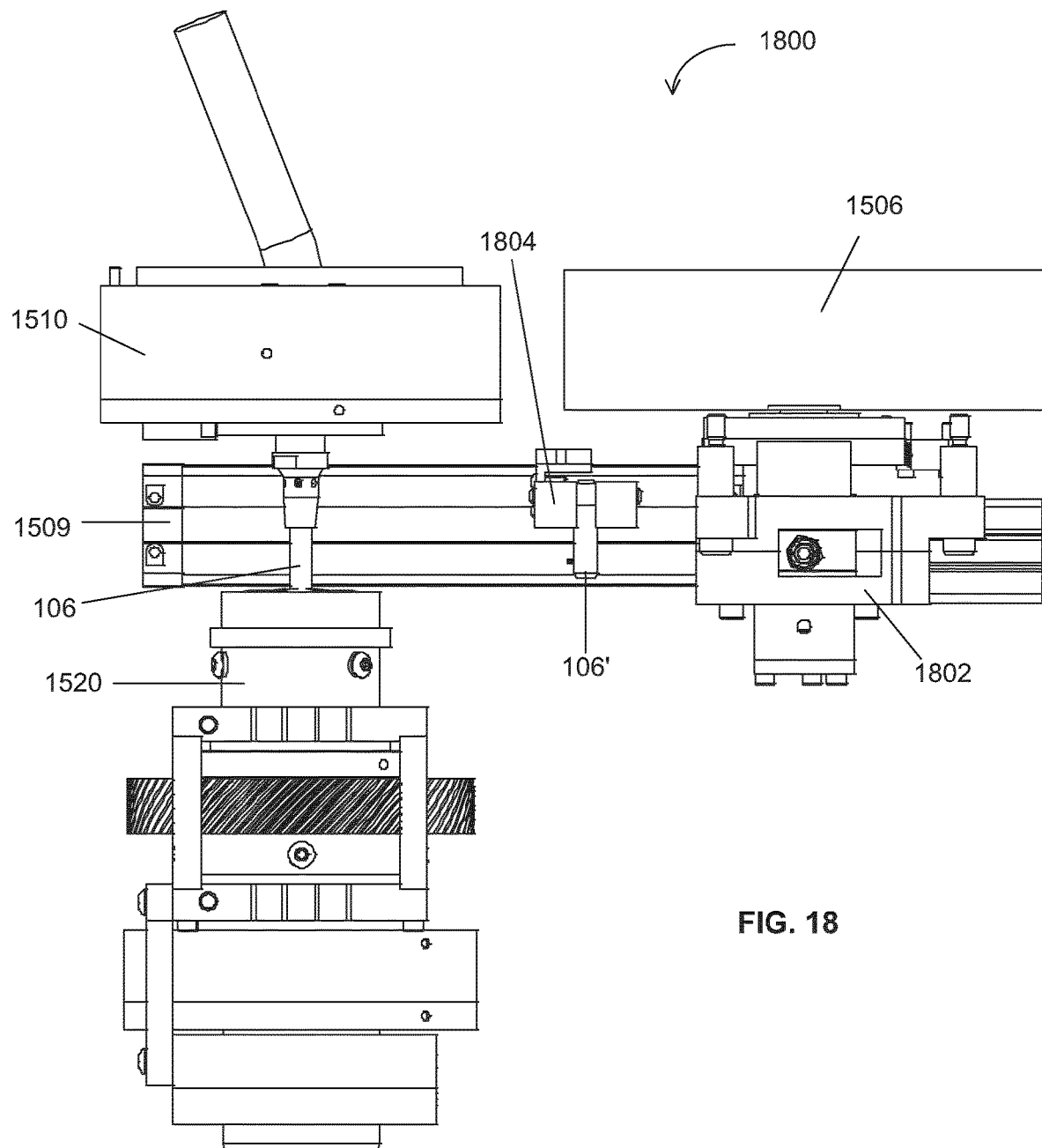
FIG. 18 is a sectional view of a tip feeder assembly in accordance with one embodiment of the present invention.

FIG. 18 shows an exemplary tip feeder assembly 1800 in accordance with one embodiment of the present invention. The tip feeder assembly 1800 comprises the welding tip magazine 1506 for storing new or replacement welding tips, a tip feeder 1802 which receives a new welding tip 106' from the welding tip magazine 1506, and a tip gripper 1804 which holds and transports the new welding tip 106' to a gripping means, for example, the gripper collet 1520. The tip gripper 1804 may be moved by a pneumatic rodless cylinder 1509 between the welding tip magazine 1506 and the gripper collet 1520. The welding tip magazine 1506 holds a number of new tips in standing position. A new welding tip 106' is fed one at a time to the tip gripper 1804 and the tip gripper 1804 transfers the new welding tip 106' to the welding tip changer module 1508.

Figure 19:
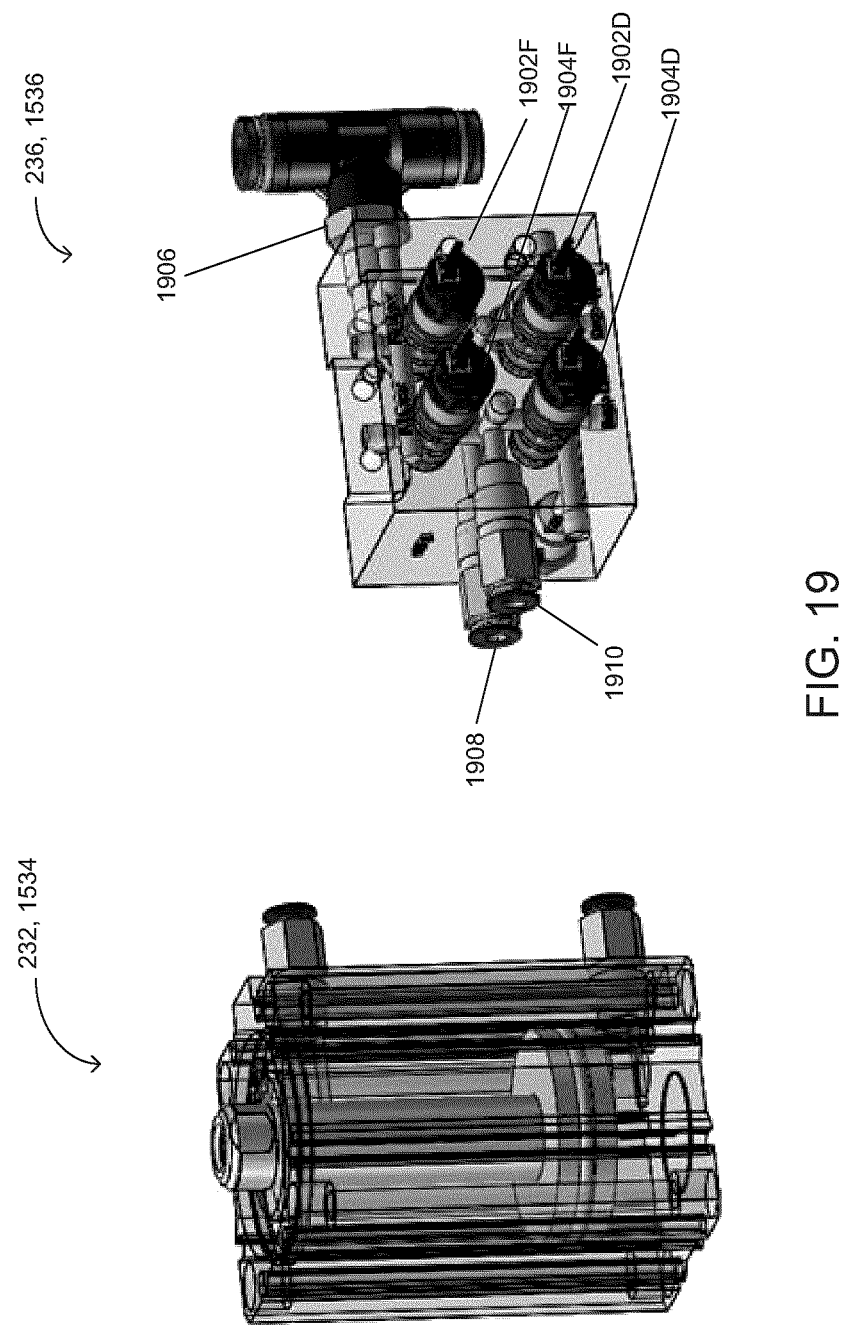
FIG. 19 is a see-through view of an exemplary cylinder and an exemplary dump and fill manifold in accordance with one embodiment of the present invention.

FIG. 19 provides a see-through view of the cylinder 232, 1534 used in the lift system of the nozzle removal module 300 and the lift system of the welding tip changing module 1508, according to one embodiment of the invention. The cylinder 232, 1534 is used in connection with a dump and fill manifold 236, 1536. The dump and fill manifold 236, 1536 includes two valves 1902D, 1902F in its upper chamber and two valves 1904D, 1904F in its lower chamber, one of the two upper/lower valves 1902D, 1904D being a dump valve and the other one of the two upper/lower valves 1902F, 1904F being a fill valve. A main air line 1906 feeds both upper and lower fill valves 1902F, 1904F. Upper dump valve 1902D is linked to EXH Upper, while lower dump valve 1904D is linked to EXH Lower. Out upper 1908 is linked to both upper dump valve 1902D and upper fill valve 1902F; and out lower 1910 is linked to both lower dump valve 1904D and lower fill valve 1904F. For each air inlet 234, 1538 of the cylinder 232, 1534, air can travel both ways. When the cylinder 232, 1534 is to be moved downwards, both fill valves 1902F, 1904F in the upper and lower chambers are turned on and the lower dump valve 1904D is activated to release air from the bottom chamber. When the cylinder 232, 1534 is to be moved upwards, both fill valves 1902F, 1904F are turned on and the upper dump valve 1902D is activated to release pressure from the upper chamber.

Figure 20:
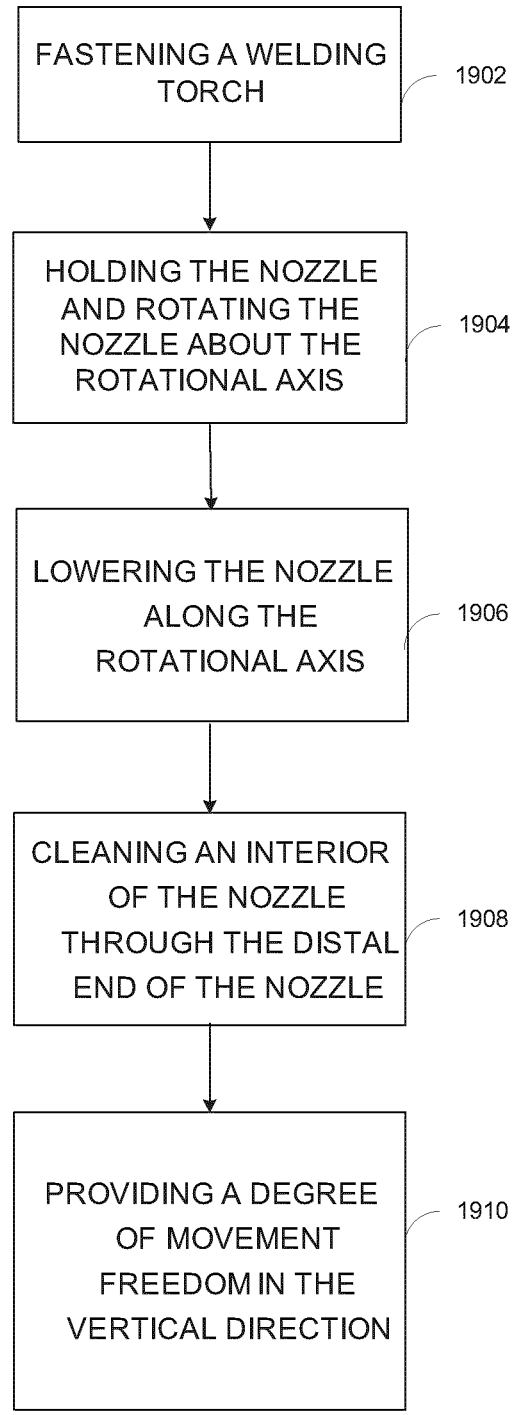
FIG. 20 is a flow chart showing a method for removing and cleaning nozzle.

FIG. 20 is a flow chart showing generally a method for removing and cleaning the nozzle 108 of the welding torch 102 according to an embodiment of the invention. Prior to the operation, a robotic arm may first move the welding torch 102 to the welding wire cutter 260 for clipping the end of the weld wire from the welding tip 106. At step 1902, the welding torch 102 may be lowered into aperture 206 of the enclosure 212 and the first clamp 210 is caused to fasten and align the welding torch 102 in place. As a result, the welding torch 102 is secured and the nozzle 108 of the welding torch 102 is aligned with the rotational axis 201. At step 1904, the second clamp 212 transitions into the closing position to hold the nozzle 108 and rotates about the axis 201 to unscrew the nozzle 108 from the welding torch 102. The rotation may be caused by the rotary pneumatic motor 214 through the helical gear 218 and preferably starts prior to the second clamp 212 moving into the closing position. Simultaneously or subsequently at step 1906, the lift system is actuated and the nozzle 108 is lowered vertically along the rotational axis 201 to detach from the welding torch 102. An interior of the nozzle 108 is then cleaned at step 1908, by means for example of a brush or reamer 412 entering the nozzle 108 from the distal end 120. The nozzle 108 may continue to be rotated and/or actuated in the vertical direction along the axis 201. The brush or reamer 412 may be static or rotary. The relative movement between the brush or reamer 412 and the nozzle 108 dislocates spatters accumulated on interior surfaces of the nozzle 108. At this time, pneumatic pressure may be applied to the vacuum mode via air inlet 404 where the spatter dislocated from the nozzle 108 is removed and vacuumed down through the bore of the shaft.

After the nozzle 108 is detached from the welding torch 102, the robotic arm may lift the welding torch 102 out of the aperture 206 and into aperture 204 for cleaning of the welding tip 106 and/or diffuser 110. Prior to doing so, the wire may be cut for a second time to remove wire exposed during the process; alternatively, the exposed wire may be retracted to save operational time. The robotic arm may move the welding torch 102 up and down while the diffuser cleaning means rotates. Once the welding tip 106 and/or diffuser 110 is cleaned, it is easier for the welding tip 106 to be clamped for its removal and/or replacement.

As illustrated in step 1910, a degree of movement freedom is provided in the vertical direction for detaching or reattaching of the nozzle 108.

Figure 21:
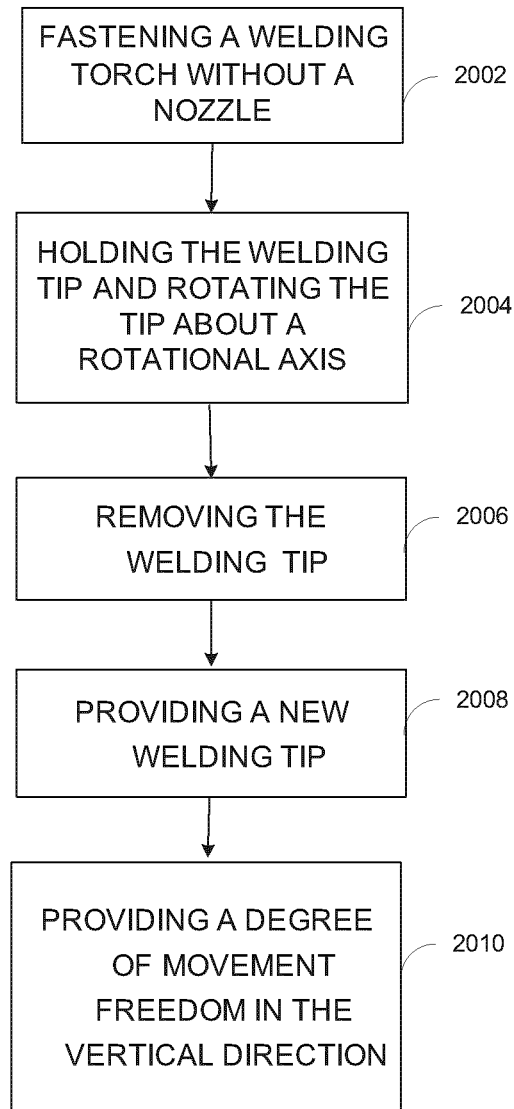
FIG. 21 is a flow chart showing a method for changing a welding tip.

FIG. 21 is a flow chart showing generally a method for replacing a welding tip 106, according to an embodiment of the invention. After the nozzle 108 is removed from the welding torch 102, the robotic arm may move the welding torch 102 to the welding tip changing apparatus 1500. At step 2002, the first clamp 1510 grips the diffuser 110 so that the welding tip 106 of the welding torch 102 is in alignment with the rotational axis 1518. At this time, the rotary second clamp 1512 may be in an open position. At step 2004, the rotary second clamp 1512 closes to engage the welding tip 106 and rotates the welding tip 106 about the rotational axis 1518. The second clamp 1512 may be caused to rotate, preferably before the second clamp moves into the closing position. Simultaneously or subsequently the second clamp 1512 is actuated vertically to remove the welding tip 106 from the diffuser 110, at step 2006. The first clamp 1510 then moves into the open position to release the diffuser 110, where the robotic arm may lift the welding torch 102 without the welding tip 106 attached. At this time an amount of wire may be exposed which is about the length of the welding tip 106. Such a portion of the wire can either be cut by the wire cutter 260 for a third time, or retracted to save operational time. The removed welding tip 106 is dropped to the floor or a container.

At step 2008, a new or replacement welding tip 106' is provided by the welding tip magazine 1506 and held by the tip gripper 1804 to bring to a position which is in alignment with the rotational axis 1518. The second clamp 1512 may then be actuated to move up to grab the new welding tip 106'. Once the second clamp 1512 securely holds the new welding tip 106', the tip gripper 1804 opens to release it. The second clamp 1512 is then actuated to move downwards with the new welding tip 106' to detach it from the tip gripper 1804 and the tip gripper 1804 is sent back to the tip feeder 1802. For reattaching the welding tip 106', the welding torch 102 is lowered again into the welding tip changing apparatus 1500 to be secured by the first clamp 1510 and in alignment with the rotational axis 1518. The second clamp 1512 moves upwards while rotating to thread the new welding tip 106' to the diffuser 110. The threading operation may not be completed in a single run; rather, the second clamp 1512 may be stopped at intervals to avoid thread relaxation. As described above, the lift system and the springs 1618, 1620 act to adjust the vertical movement, and thereby providing a degree of movement freedom in the vertical direction. Once the threading operation is completed, the second clamp 1512 and the first clamp 1510 open and the robotic arm carrying the welding torch 102 with the new welding tip attached is lifted out of the welding tip changing apparatus 1500. At this time a new welding tip may be provided to the tip gripper 1804 to prepare for a next replacement operation.

To place the cleaned nozzle 108 back on, the robotic arm moves the welding torch 102 back to the nozzle removal module 300, 300'. Again, the welding torch 102 is clamped by the first clamp 210 for example at the goose neck 114. The cleaned nozzle 108 is clamped in place by the second clamp 212. In case of a threaded nozzle 108, the second clamp 212 will be actuated to rotate and move vertically to thread the cleaned nozzle 108 onto the collar 116 of the welding torch 102, similar to the threading operation of the new welding tip 106' described above. A degree of movement freedom is provided in the vertical direction by way of the lift system and the springs 310, 312. Optionally, vacuum mode may be turned on in case more weld spatter comes off during the process. Once the nozzle 108 is reattached to the welding torch 102, the first and second clamps 210, 212 are turned open and the robotic arm lifts the welding torch 102 with a new welding tip 106' and a cleaned nozzle 108, which can be put back to welding operation.

As described above, the servicing of the welding torch 102 can be completed in a single run, by moving the welding torch between the nozzle removal module 300, 300', the diffuser cleaning module 400, 400', and the welding tip changer module 1508, 1508'. Alternatively, the various modules can be used separately for their individual functions.

The welding torch maintenance apparatus 200 may also include a user interface for diagnostic and/or programming purposes. According to one embodiment, the user interface for the welding torch maintenance apparatus 200 may include a simple membrane switch and a more complex webserver.

Figure 22:
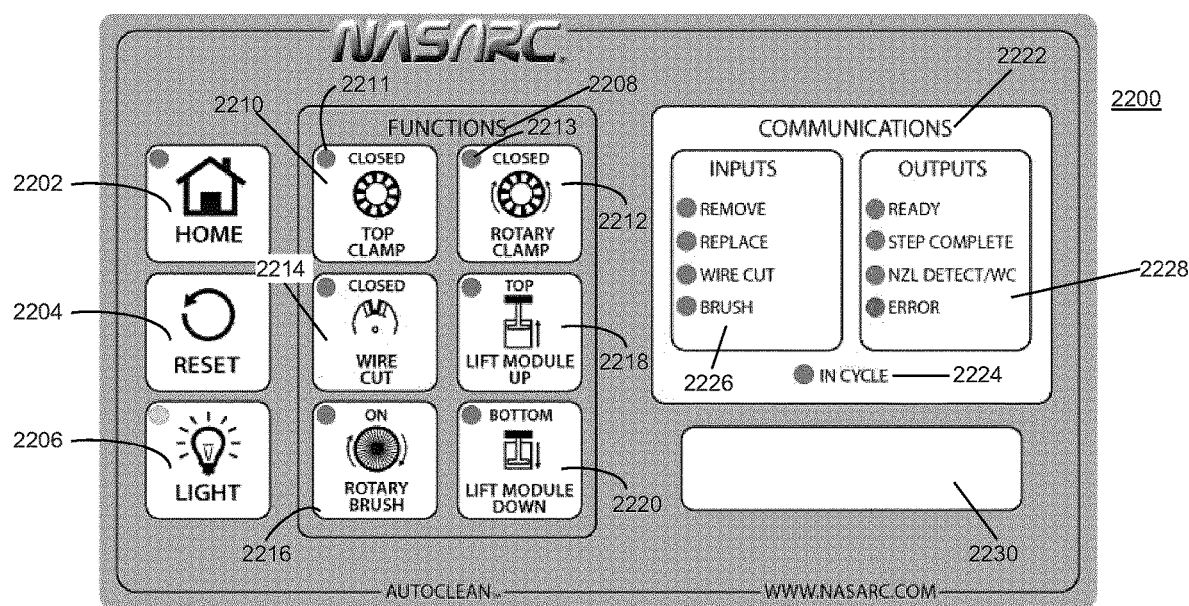
FIG. 22 is an exemplary simple membrane switch interface for the welding torch maintenance apparatus.

FIG. 22 illustrates an example of a simple membrane switch interface 2200 for the welding torch maintenance apparatus 200. The simple membrane switch interface 2200 is designed to be used as a simple user point of diagnostic and programming interface. The simple membrane switch interface 2200 may include a number of controls and provide feedback for the user to program the welding torch maintenance apparatus 200 to work with a robot. As shown in FIG. 22, the simple membrane switch interface 2200 may include a "Home" button 2202 that sends the welding torch maintenance apparatus 200 to a known state where it is immediately ready to run a cycle, e.g., a nozzle clean cycle. The LED indicator associated with the "Home" button 2202 shows the user when the welding torch maintenance apparatus 200 is at the home position. The simple membrane switch interface 2200 may also include a "Reset" button 2204 that clears any active alarms on the welding torch maintenance apparatus 200 and sends the program to a user-controlled state before the alarms. A "Light" button 2206 may further be provided to turn on a LED light inside the welding torch maintenance apparatus 200 to allow the user to see more clearly inside the apparatus. The LED indicator associated with the "Light" button 2206 provides feedback to the user to indicate that the light has been turned on.

The simple membrane switch interface 2200 may also include a "Functions" area 2208, which include a number of controls as shown in FIG. 22. The "Top Clamp" button 2210 may allow the user to activate the first clamp 210 and see a sensor status/feedback through its LED indicator 2211. The "Rotary Clamp" button 2212 may allow the user to activate the second clamp 212 inside the apparatus 200, and see a sensor status/feedback through its LED indicator 2213. These two buttons can be helpful in determining when the central axis 201 of the nozzle removal module 300, 300' is aligned with the central axis of the nozzle 108 of the welding torch 102. A "Wire Cut" button 2214 and a "Rotary Brush" button 2216 allow the user to control the welding wire cutter 260 and the cleaner means 412 respectively, to ensure correct operations, and/or to validate their robot's programming points. A "Lift Module Up" button 2218 and a "Lift Module Down" button 2220 allow the user to send the nozzle removal module 300, 300' in the corresponding directions. Their corresponding LED indicators show when the module 300, 300' is near these respective positions.

The simple membrane switch interface 2200 may further include a "Communications" area 2222 which include s number of LED indicators for indicating the status of the apparatus 200 to the user. An "In Cycle" LED indicator 2224 is active any time a cycle is in progress. The other LED indicators may show the status of inputs 2226 coming to the welding torch maintenance apparatus 200 from the robot, and the status of outputs 2228 going from the welding torch maintenance apparatus 200 to the robot. These LED indicators 2226, 2228 may show the status of any discrete and/or networked inputs and outputs. The simple membrane switch interface 2200 may include an LCD display for indicating the current IP address of the welding torch maintenance apparatus 200, as well as any active errors. In FIG. 22, the LCD display is shown as the white box 2230 under the "Communications" area 2222 which may be a transparent pane that covers a green, backlit LCD display. If there are no active errors, the LCD display 2230 may display the IP address at all times. If there are active errors, the display 2230 may toggle through the different errors as well as the IP address. The IP address shown can be used to facilitate troubleshooting through the webserver.

The simple membrane switch interface 2200 may be controlled by a printed circuit board (PCB) mounted inside the enclosure 202. The LCD display 2230 may be mounted on and controlled by this PCB as well, and is visible through a cut-out on the enclosure 202, for example, through a belly plate of the enclosure 202. The PCB may communicate as a MODBUS slave over RS-485 to the main controller for the welding torch maintenance apparatus 200.

In addition to the simple membrane switch interface 2200, a webserver may be provided to each welding torch maintenance apparatus 200 for giving the user access to more data than is available on the simple membrane switch 2200. The webserver may also grant the welding torch maintenance apparatus 200 remote accessibility. The webserver may be hosted on an integrated circuit (IC) that is additionally responsible for industrial networking.

There are several information and/or pages that may be made available on the webserver. An "Info" button may be provided that reveals the current software versions being run by the main controller, and the controller of the simple membrane switch interface 2200. A "Help" button may also be provided for displaying a concise, navigable troubleshooting guide for common issues.

Some other information may be provided by the webserver and may be made navigable through a tab control. Such information may include:

- An "Overview" page for displaying the current status of any cycle that is currently in progress. A table with all the analog sensor data and error counts may also be included;
- A "Diagnostic" page for giving the user controls to activate all of the outputs in the welding torch maintenance apparatus 200, and to activate the LEDs representing all of the inputs in the apparatus. Additionally, an option may be provided to override any of the sensors in the apparatus to verify correct operation. Another set of controls may be provided to give the user the ability to step through a nozzle clean cycle to validate that each step of the process is completed successfully. A table may be provided to show the user what steps have been completed as the user steps through the cycle;
- An "Options" page for giving the user access to some of the operation and configuration parameters of the welding torch maintenance apparatus 200; and
- A "Communications" page for giving the user the ability to view the status of the discrete and/or networked inputs and outputs, override the welding torch maintenance apparatus 200's default I/O setup, simulate sending outputs to the robot, simulate how the welding torch maintenance apparatus 200 will respond to inputs from the robot, safely test the communication control between the apparatus and the robot, and/or allow the user to reset errors, reboot the main controller, and restore the controller of the apparatus to its default settings.

The welding tip changing apparatus 1500 may also include a user interface for diagnostic and/or programming purposes. According to one embodiment of the invention, the user interface for the welding tip changing apparatus 1500 may also include a simple membrane switch and a more complex webserver. The user interface for the welding tip changing apparatus 1500 may be similar to the user interface for the welding torch maintenance apparatus 200 described above, or may be differently designed, based on the user preference.

Figure 23:
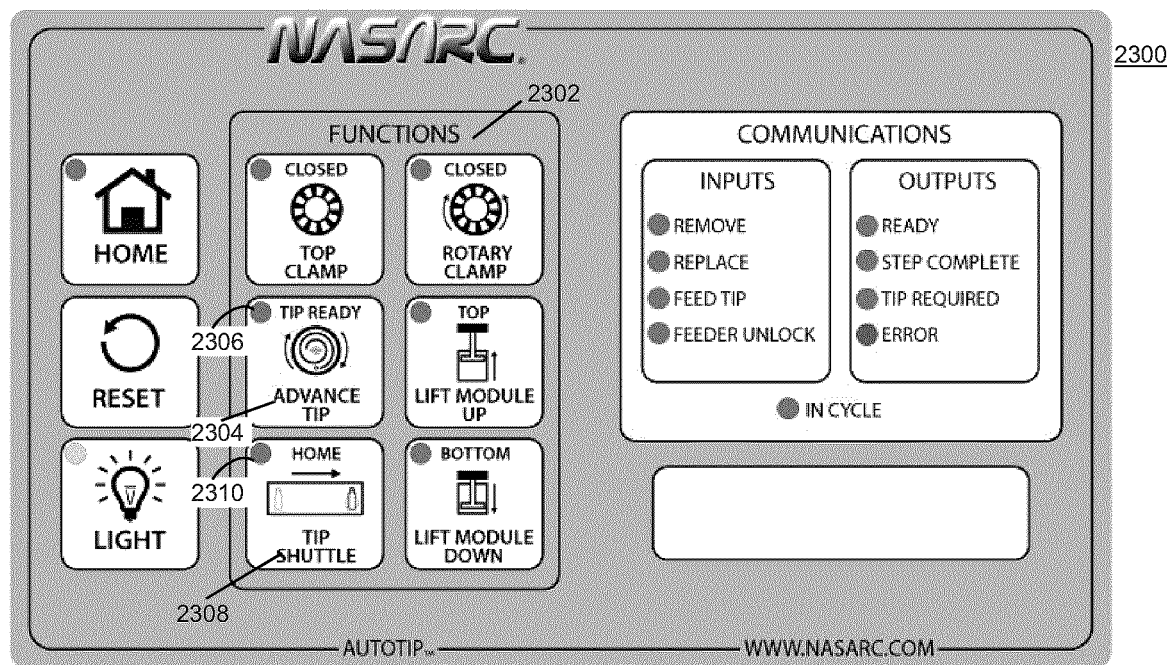
FIG. 23 is an exemplary simple membrane switch interface for the welding tip changing apparatus.

FIG. 23 illustrates an example of a simple membrane switch interface 2300 for the welding tip changing apparatus 1500. The switch interface 2300 includes a number of buttons similar to those on the switch interface 2200, provided for similar operations. An "Advance Tip" button 2304 may be provided in the "Functions" area 2302 and is used to feed a new tip 106' from the welding tip magazine 1506 to the tip feeder 1802 where it will be available to be installed during the next cycle. A "Tip Ready" LED indicator 2306 above the button 2304 indicates whether or not a tip is presently sitting in the tip gripper 1804. A "Tip Shuttle" button 2308 may be provided which will bring the tip gripper 1804 (attached to the rodless cylinder 1509) to the tip holder position. The "Home" LED indicator 2310 above the button 2308 indicates when the tip gripper 1804 is at the tip holder position.

In addition to the simple membrane switch interface 2300, a webserver may also be provided to each welding tip changing apparatus 1500 for giving the user access to more data than is available on the simple membrane switch 2300. For all intents and purposes, the description outlined for the webserver functionality of the welding torch maintenance apparatus 200 can be used for the webserver of the welding tip changing apparatus 1500. While there are different devices within the welding tip changing apparatus 1500, and a few different configuration parameters, it will be apparent to persons skilled in the art that the webserver functionality of the welding torch maintenance apparatus 200 can be adapted to apply to the welding tip changing apparatus 1500.

While the user interface for the welding torch maintenance apparatus and that for the welding tip changing apparatus are described with reference to specific layouts of the buttons and displays, it will be apparent to a person skilled in the art that different layouts may be used, and a number of other buttons, panels and/or information may be included in the user interface for similar or other diagnostic and programming purposes, depending on the features desired by the user.

The present invention has been described with regard to one or more embodiments. However, it will be apparent to persons skilled in the art that a number of variations and modifications can be made without departing from the scope of the invention as defined in the claims.

All citations are hereby incorporated by reference.

What is claimed is:

1. A method for replacing a welding tip comprising:
    fastening, by a first gripping module, a diffuser of a welding torch without a nozzle so that a welding tip of the welding torch is in alignment with a rotational axis;
    engaging, with a second gripping module, the welding tip of the welding torch;
    simultaneously rotating the welding tip about the rotational axis and actuating the second gripping module vertically along the rotational axis to remove the welding tip from the diffuser;
    providing a new welding tip to the second gripping module; and
    attaching the new welding tip to the welding torch,
    wherein a degree of movement freedom is provided for the second gripping module in a direction parallel to the rotational axis, and
    wherein the second gripping module is actuated along the rotational axis by a lift system, the lift system comprising:
        a first rail;
        a carriage movable along the first rail, the carriage carrying the second gripping module; and
        a level assembly configured to provide the degree of movement freedom via the carriage in the direction parallel to the rotational axis,
    the level assembly comprising:
        a resilient member; and
        a holder member configured to hold a lifting member configured to lift the carriage, the holder member coupled to the resilient member; and
        a supporting member coupled to the resilient member such that the holder member is movable relative to the supporting member.

2. The method of claim 1, wherein the second gripping module is caused to rotate before engaging with the welding tip.

3. The method of claim 1, wherein the new welding tip is provided from a welding tip magazine.

4. The method of claim 3, wherein providing the new welding tip comprises transporting the new welding tip with a tip gripper from the welding tip magazine to a position in alignment with the rotational axis, and gripping the new welding tip with the second gripping module.

5. The method of claim 1, wherein the second gripping module is actuated along the rotational axis and is rotated to attach the new welding tip to the welding torch.

6. The method of claim 5, wherein the attaching the new welding tip to the welding torch is stopped at predetermined intervals.

7. The method of claim 1, further comprising removing the nozzle from the welding torch prior to fastening the diffuser of the welding torch.

8. The method of claim 1, further comprising cleaning the welding tip and/or diffuser of the welding torch prior to fastening the diffuser of the welding torch and engaging the welding tip.

9. The method of claim 1, wherein the second gripping module is rotated by a drive module.

* * * * *